United States Patent
Xuan et al.

(10) Patent No.: US 10,079,780 B2
(45) Date of Patent: Sep. 18, 2018

(54) PACKET PROCESSING METHOD AND DEVICE

(71) Applicant: Huawei Technologies Co., Ltd., Shenzhen, Guangdong (CN)

(72) Inventors: Yuanzhe Xuan, Shenzhen (CN); Zhefeng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 410 days.

(21) Appl. No.: 14/839,187

(22) Filed: Aug. 28, 2015

(65) Prior Publication Data
US 2015/0372947 A1 Dec. 24, 2015

Related U.S. Application Data

(63) Continuation of application No. PCT/CN2014/073516, filed on Mar. 17, 2014.

(30) Foreign Application Priority Data

Mar. 15, 2013 (CN) .......................... 2013 1 0084254

(51) Int. Cl.
*H04L 12/28* (2006.01)
*H04L 12/935* (2013.01)
*H04L 29/08* (2006.01)
*H04L 12/725* (2013.01)
(Continued)

(52) U.S. Cl.
CPC ...... *H04L 49/3009* (2013.01); *H04L 12/6418* (2013.01); *H04L 45/306* (2013.01); *H04L 45/72* (2013.01); *H04L 67/327* (2013.01)

(58) Field of Classification Search
CPC ..... H04L 67/327; H04L 45/306; H04L 67/10; H04L 45/54; H04L 45/745;
(Continued)

(56) References Cited

U.S. PATENT DOCUMENTS

| 9,282,050 B2* | 3/2016 | Mosko ................. H04L 47/365 |
| 2010/0195655 A1* | 8/2010 | Jacobson .............. H04L 45/748 |
| | | 370/392 |
| 2012/0317643 A1 | 12/2012 | Kim |
| 2014/0181140 A1* | 6/2014 | Kim ....................... H04L 67/06 |
| | | 707/769 |

FOREIGN PATENT DOCUMENTS

| CN | 101820386 A | 9/2010 |
| CN | 102821039 A | 12/2012 |

(Continued)

OTHER PUBLICATIONS

Ravishankar Ravindran et al., "Supporting Dual-Mode Forwarding in Content-Centric Network", Dec. 16-19, 2012, 6 pages.
(Continued)

*Primary Examiner* — Yemane Mesfin
*Assistant Examiner* — Mon Cheri Davenport

(57) ABSTRACT

Embodiments of the present invention provide a packet processing method and a device. The method includes: receiving a data packet that is generated and sent by a destination device after the destination device receives a first interest packet that is forwarded by a source device via the forwarding node, where the data packet carries a content name that is the same as a content name of content requested by using the first interest packet; when forwarding the first interest packet, generating, a PIT entry corresponding to the first interest packet in the PIT; and when determining that the data packet carries a second interest packet, matching the content name carried in the data packet with a content name in the PIT entry, and forwarding the data packet to the source device according to a port in the matched PIT entry.

44 Claims, 11 Drawing Sheets

(51) Int. Cl.
*H04L 12/64* (2006.01)
*H04L 12/721* (2013.01)

(58) Field of Classification Search
CPC ............. H04L 67/1095; H04L 67/2842; H04L
41/0803; H04L 45/64; H04L 63/00; H04L
47/31; H04L 49/3009; H04L 51/14; H04L
61/10; H04L 61/1582; H04L 63/0245;
H04L 63/102; H04L 67/28; H04L
67/2814; H04L 69/22; G06F 17/30424;
G06F 17/30867; H04W 40/02; H04W
36/0033
See application file for complete search history.

(56) References Cited

FOREIGN PATENT DOCUMENTS

CN      103118013 A      5/2013
WO   WO 2013/000165 A1   1/2013

OTHER PUBLICATIONS

Lixia Zhang, et al., "Named Data Networking (NDN) Project", Oct. 31, 2010, 26 pages.

Jihoon Lee, et al. "Proxy-assisted Content Sharing Using Content Centric Networking (CCN) for Resource-limited Mobile Consumer Devices", IEEE Transactions on Consumer Electronics, vol. 57, No. 2, May 1, 2011, p. 477-483.

Haowei Yuan, et al., "Scalable NDN Forwarding: Concepts, Issues and Principles", Computer Communications and Networks, Jul. 30, 2012, 9 pages.

* cited by examiner

PACKET PROCESSING METHOD AND DEVICE

CROSS-REFERENCE TO RELATED APPLICATIONS

This application is a continuation of International Application No. PCT/CN2014/073516, filed on Mar. 17, 2014, which claims priority to Chinese Patent Application No. 201310084254.1, filed on Mar. 15, 2013, both of which are hereby incorporated by reference in their entireties.

TECHNICAL FIELD

Embodiments of the present invention relate to communications technologies, and in particular, to a packet processing method and a device.

BACKGROUND

With the development of the Internet, increasing applications are targeting generating, propagating, and sharing a variety of information. Therefore, a fully new information/content-centric network application mode emerges. A network in this mode are referred to as an information centric network (Information Centric Network, ICN for short). In the ICN, a named data network (Named Data Network, NDN for short) has relatively great influence.

In the NDN, two types of packets are mainly used: an interest packet (Interest packet) and a data packet (Data packet). The NDN maintains three tables: a storage table (Content Store, CS for short), a pending information table (Pending Interest Table, PIT for short), and a forwarding table (Forwarding Information Table, FIB for short), and performs forwarding and processing of the interest packet based on the three tables. In the NDN, a process of forwarding an interest packet is: when receiving an interest packet, a router in the NDN first queries the CS according to a content name (Content Name) in the interest packet; if the CS includes content matching the content name, sends the content through an incoming port of the interest packet. If the CS does not include content matching the content name, continues to query the PIT by using the content name, to determine whether there has been an interest packet for requesting same content; if the PIT includes a PIT entry matching the content name, adds the incoming port of the interest packet to the PIT entry and continues to receive a next packet. If the PIT does not include a PIT entry matching the content name, continues to query the FIB by using the content name. If the FIB includes an FIB entry matching the content name, forwards the interest packet to a next hop through an outgoing port in the matched FIB entry, where the next hop uses a same manner to forward the interest packet. If the FIB does not include an FIB entry matching the content name, discards the interest packet. It can be seen that, in an NDN, an FIB needs to be queried hop by hop for routing an interest packet, which leads to relatively low routing efficiency.

SUMMARY

Embodiments of the present invention provide a packet processing method and a device, so as to resolve a problem of relatively low efficiency of routing an interest packet in the prior art.

According to a first aspect, a packet processing method is provided, where the method is applied to a forwarding node in an information centric network (ICN), where the forwarding node includes a pending information table (PIT), the PIT includes one or more PIT entries, and each PIT entry includes a content name and a port; and the method includes:

receiving, by the forwarding node, a data packet, where the data packet is generated and sent by a destination device after the destination device receives a first interest packet that is sent by a source device and is forwarded via the forwarding node, where the first interest packet is used by the source device to request content from the destination device, the data packet carries a content name that is the same as a content name of the content requested by using the first interest packet, and when forwarding the first interest packet, the forwarding node matches the first interest packet with the pending information table, so that the pending information table includes a PIT entry corresponding to the first interest packet; and when determining that the data packet carries a second interest packet, matching the content name carried in the data packet with a content name in the PIT entry, and forwarding the data packet to the source device according to a port in the matched PIT entry, where the second interest packet is used by the destination device to request content from the source device.

With reference to the first aspect, in a first possible implementation manner of the first aspect, the method further includes: when determining that the data packet carries the second interest packet and before matching the content name carried in the data packet with the content name in the PIT entry, and forwarding the data packet to the source device according to the port in the matched PIT entry, querying a local storage table CS according to a content name in the second interest packet, and determining that content corresponding to the content name in the second interest packet does not exist in the local CS.

With reference to the first possible implementation manner of the first aspect, in a second possible implementation manner of the first aspect, the method further includes: before matching the content name carried in the data packet with the content name in the PIT entry, and forwarding the data packet to the source device according to the port in the matched PIT entry, if determining that the content corresponding to the content name in the second interest packet exists in the local CS, sending, through a port through which the data packet is received, the content that is in the local CS and corresponds to the content name in the second interest packet.

With reference to the second possible implementation manner of the first aspect, in a third possible implementation manner of the first aspect, the sending, through a port through which the data packet is received, the content that is in the local CS and corresponds to the content name in the second interest packet, and the matching the content name carried in the data packet with a content name in the PIT entry, and forwarding the data packet to the source device according to a port in the matched PIT entry include:

sending, through the port through which the data packet is received, the content that is in the local CS and corresponds to the content name in the second interest packet, deleting the second interest packet from the data packet, matching the content name carried in the data packet with the content name in the PIT entry, and forwarding, to the source device according to the port in the matched PIT entry, the data packet from which the second interest packet is deleted.

With reference to the first aspect, or the first possible implementation manner of the first aspect, or the second possible implementation manner of the first aspect, or the third possible implementation manner of the first aspect, in a fourth possible implementation manner of the first aspect, the method further includes: after receiving the data packet and determining that the data packet carries the second interest packet, generating or updating a PIT entry corresponding to the second interest packet.

With reference to the fourth possible implementation manner of the first aspect, in a fifth possible implementation manner of the first aspect, the generating or updating a PIT entry corresponding to the second interest packet includes:

querying the pending information table according to the content name in the second interest packet; and if a PIT entry which includes the content name in the second interest packet exists in the pending information table, adding, to the PIT entry which includes the content name in the second interest packet, information about the port through which the data packet is received, so as to update the PIT entry corresponding to the second interest packet; or if a PIT entry which includes the content name in the second interest packet does not exist in the pending information table, adding, to the pending information table, a PIT entry which includes the content name in the second interest packet and information about the port through which the data packet is received, so as to generate the PIT entry corresponding to the second interest packet.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner of the first aspect, the method further includes: when determining that the data packet does not carry the second interest packet, matching the content name carried in the data packet with the content name in the PIT entry, and forwarding the data packet to the source device according to the port in the matched PIT entry.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, in a seventh possible implementation manner of the first aspect, the method further includes: after forwarding the data packet to the source device according to the port in the matched PIT entry, removing the matched PIT entry from the pending information table.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, in an eighth possible implementation manner of the first aspect, there is one or more second interest packets.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, in a ninth possible implementation manner of the first aspect, the data packet further carries a piggyback interest identifier that is used to identify whether the data packet carries the second interest packet; and the when determining that the data packet carries a second interest packet, matching the content name carried in the data packet with a content name in the PIT entry, and forwarding the data packet to the source device according to a port in the matched PIT entry, includes:

when determining, by determining a value of the piggyback interest identifier, that the data packet carries the second interest packet, matching the content name carried in the data packet with the content name in the PIT entry, and forwarding the data packet to the source device according to the port in the matched PIT entry.

With reference to the ninth possible implementation manner of the first aspect, in a tenth possible implementation manner of the first aspect, a manner of carrying the piggyback interest identifier in the data packet includes:

carrying the piggyback interest identifier in a digital signature information field of the data packet; or adding a first field to the data packet, and carrying the piggyback interest identifier in the first field.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, or the tenth possible implementation manner of the first aspect, in an eleventh possible implementation manner of the first aspect, a manner of carrying the second interest packet in the data packet includes:

adding a second field before a data payload field to the data packet, and carrying the second interest packet in the second field; or adding a third field after a data payload field to the data packet, and carrying the second interest packet in the third field.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, or the tenth possible implementation manner of the first aspect, or the eleventh possible implementation manner of the first aspect, in a twelfth possible implementation manner of the first aspect, when multiple other forwarding nodes exist between the forwarding node and the source device, the forwarding the data packet to the source device according to a port in the matched PIT entry includes:

forwarding the data packet to a next forwarding node according to the port in the matched PIT entry, so that after receiving the data packet and when determining that the data packet carries the second interest packet, the next forwarding node matches the content name carried in the data packet with the content name in the PIT entry, and then forwards the data packet to a next forwarding node according to a port in the matched PIT entry, and so on, so as to forward the data packet to the source device.

According to a second aspect, a packet processing method is provided, including:

generating, by a destination device, a data packet according to a received first interest packet, where the first interest packet is forwarded by a source device via a forwarding node and is used by the source device to request content from the destination device, where the forwarding node includes a pending information table (PIT), the PIT includes one or more PIT entries, and each PIT entry includes a content name and a port; and when forwarding the first interest packet, the forwarding node matches the first interest packet with the pending information table, so that the pending information table includes a PIT entry corresponding to the first interest packet;

when determining that a second interest packet which is going to be sent to the source device needs to be carried in the data packet, carrying, by the destination device, the second interest packet in the data packet, where the second interest packet is used by the destination device to request content from the source device; and sending, by the destination device, the data packet to the forwarding node, so that when determining that the data packet carries the second interest packet, the forwarding node matches a content name carried in the data packet with a content name in the PIT entry, and forwards the data packet to the source device according to a port in the matched PIT entry.

With reference to the second aspect, in a first possible implementation manner of the second aspect, the method further includes: when determining that the second interest packet which is going to be sent to the source device needs to be carried in the data packet, carrying, by the destination device, a piggyback interest identifier in the data packet, and setting a value of the piggyback interest identifier to a value used to identify that the data packet carries the second interest packet, where the piggyback interest identifier is used to identify whether the data packet carries the second interest packet.

With reference to the second aspect or the first possible implementation manner of the second aspect, in a second possible implementation manner of the second aspect, there is one or more second interest packets.

With reference to the first possible implementation manner of the second aspect or the second possible implementation manner of the second aspect, in a third possible implementation manner of the second aspect, the carrying, by the destination device, a piggyback interest identifier in the data packet includes:

carrying, by the destination device, the piggyback interest identifier in a digital signature information field of the data packet; or adding, by the destination device, a first field to the data packet, and carrying the piggyback interest identifier in the first field.

With reference to the second aspect, or the first possible implementation manner of the second aspect, or the second possible implementation manner of the second aspect, or the third possible implementation manner of the second aspect, in a fourth possible implementation manner of the second aspect, the carrying, by the destination device, the second interest packet in the data packet includes:

adding, by the destination device, a second field before a data payload field to the data packet, and carrying the second interest packet in the second field; or adding, by the destination device, a third field after a data payload field to the data packet, and carrying the second interest packet in the third field.

According to a third aspect, a packet processing method is provided, including:

receiving, by a source device, a first data packet, where the first data packet is generated by a destination device according to a first interest packet of the source device and is forwarded via a forwarding node, where the first interest packet is used by the source device to request content from the destination device; the forwarding node includes a pending information table (PIT), the PIT includes one or more PIT entries, and each PIT entry includes a content name and a port; and after receiving the first data packet and determining that the first data packet carries a second interest packet, the forwarding node generates or updates a PIT entry corresponding to the second interest packet, where the second interest packet is used by the destination device to request content from the source device;

when determining that the first data packet carries the second interest packet, acquiring, by the source device, the second interest packet from the first data packet, and generating a second data packet according to the second interest packet, where the second data packet carries a content name that is the same as a content name of the content requested by using the second interest packet; and sending, by the source device, the second data packet to the forwarding node, so that the forwarding node matches the content name carried in the second data packet with a content name in the PIT entry, and forwards the second data packet to the destination device according to a port in the matched PIT entry.

With reference to the third aspect, in a first possible implementation manner of the third aspect, the first data packet further carries a piggyback interest identifier that is used to identify whether the first data packet carries the second interest packet; and the when determining that the first data packet carries the second interest packet, acquiring, by the source device, the second interest packet from the first data packet, and generating a second data packet according to the second interest packet, includes:

when determining, by determining a value of the piggyback interest identifier, that the first data packet carries the second interest packet, acquiring, by the source device, the second interest packet from the first data packet, and generating the second data packet according to the second interest packet.

With reference to the third aspect or the first possible implementation manner of the third aspect, in a second possible implementation manner of the third aspect, the method further includes: acquiring, from the first data packet, the content requested by using the first interest packet, and processing the content.

With reference to the third aspect, or the first possible implementation manner of the third aspect, or the second possible implementation manner of the third aspect, in a third possible implementation manner of the third aspect, there is one or more second interest packets.

According to a fourth aspect, a forwarding node is provided, where the forwarding node includes a pending information table (PIT), the PIT includes one or more PIT entries, and each PIT entry includes a content name and a port; and the forwarding node further includes:

a receiving module, configured to receive a data packet, where the data packet is generated and sent by a destination device after the destination device receives a first interest packet that is sent by a source device and is forwarded via the forwarding node, where the first interest packet is used by the source device to request content from the destination device, the data packet carries a content name that is the same as a content name of the content requested by using the first interest packet, and when forwarding the first interest packet, the forwarding node matches the first interest packet with the pending information table, so that the pending information table includes a PIT entry corresponding to the first interest packet; and a forwarding processing module, configured to: when determining that the data packet carries a second interest packet, match the content name carried in the data packet with a content name in the PIT entry, and forward the data packet to the source device according to a port in the matched PIT entry, where the second interest packet is used by the destination device to request content from the source device.

With reference to the fourth aspect, in a first possible implementation manner of the fourth aspect, the forwarding node further includes: a determining module, configured to query a local storage table CS according to a content name in the second interest packet, and determine whether content corresponding to the content name in the second interest packet exists in the local CS; and the forwarding processing module is specifically configured to: if the determining module determines that the content corresponding to the content name in the second interest packet does not exist in the local CS, when determining that the data packet carries the second interest packet, match the content name carried in the data packet with the content name in the PIT entry, and forward the data packet to the source device according to the port in the matched PIT entry.

With reference to the first possible implementation manner of the fourth aspect, in a second possible implementation manner of the fourth aspect, the forwarding processing module is further configured to: before matching the content name carried in the data packet with the content name in the PIT entry, and forwarding the data packet to the source device according to the port in the matched PIT entry, if the determining module determines that the content corresponding to the content name in the second interest packet exists in the local CS, send, through a port through which the data packet is received, the content that is in the local CS and corresponds to the content name in the second interest packet.

With reference to the second possible implementation manner of the fourth aspect, in a third possible implementation manner of the fourth aspect, the forwarding processing module is specifically configured to: if the determining module determines that the content corresponding to the content name in the second interest packet exists in the local CS, send, through the port through which the data packet is received, the content that is in the local CS and corresponds to the content name in the second interest packet, delete the second interest packet from the data packet, match the content name carried in the data packet with the content name in the PIT entry, and forward, to the source device according to the port in the matched PIT entry, the data packet from which the second interest packet is deleted.

With reference to the fourth aspect, or the first possible implementation manner of the fourth aspect, or the second possible implementation manner of the fourth aspect, or the third possible implementation manner of the fourth aspect, in a fourth possible implementation manner of the fourth aspect, the forwarding node further includes: an entry adding module, configured to: after the data packet is received and it is determined that the data packet carries the second interest packet, generate or update a PIT entry corresponding to the second interest packet.

With reference to the fourth possible implementation manner of the fourth aspect, in a fifth possible implementation manner of the fourth aspect, the entry adding module is specifically configured to: query the pending information table according to the content name in the second interest packet; and if a PIT entry which includes the content name in the second interest packet exists in the pending information table, add, to the PIT entry which includes the content name in the second interest packet, information about the port through which the data packet is received, so as to update the PIT entry corresponding to the second interest packet; or if a PIT entry which includes the content name in the second interest packet does not exist in the pending information table, add, to the pending information table, a PIT entry which includes the content name in the second interest packet and information about the port through which the data packet is received, so as to generate the PIT entry corresponding to the second interest packet.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, in a sixth possible implementation manner of the fourth aspect, the forwarding processing module is further configured to: when determining that the data packet does not carry the second interest packet, match the content name carried in the data packet with the content name in the PIT entry, and forward the data packet to the source device according to the port in the matched PIT entry.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, in a seventh possible implementation manner of the fourth aspect, the forwarding node further includes: an entry deleting module, configured to: after the forwarding processing module forwards the data packet to the source device according to the port in the matched PIT entry, remove the matched PIT entry from the pending information table.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect, in an eighth possible implementation manner of the fourth aspect, there is one or more second interest packets.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect, or the eighth possible implementation manner of the fourth aspect, in a ninth possible implementation manner of the fourth aspect, the data packet further carries a piggyback interest identifier that is used to identify whether the data packet carries the second interest packet; and the forwarding processing module is specifically configured to: when determining, by determining a value of the piggyback interest identifier, that the data packet carries the second interest packet, match the content name carried in the data packet with the content name in the PIT entry, and forward the data packet to the source device according to the port in the matched PIT entry.

With reference to the ninth possible implementation manner of the fourth aspect, in a tenth possible implementation manner of the fourth aspect, a manner of carrying the piggyback interest identifier in the data packet includes:

carrying the piggyback interest identifier in a digital signature information field of the data packet; or adding a first field to the data packet, and carrying the piggyback interest identifier to the first field.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect, or the eighth possible implementation manner of the fourth aspect, or the ninth possible implementation manner of the fourth aspect, or the tenth possible implementation manner of the fourth aspect, in an eleventh possible implementation manner of the fourth aspect, a manner of carrying the second interest packet in the data packet includes:

adding a second field before a data payload field to the data packet, and carrying the second interest packet in the second field; or adding a third field after a data payload field to the data packet, and carrying the second interest packet in the third field.

With reference to the fourth aspect, or the first possible implementation manner of the fourth aspect, the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect, or the eighth possible implementation manner of the fourth aspect, or the ninth possible implementation manner of the fourth aspect, or the tenth possible implementation manner of the fourth aspect, or the eleventh possible implementation manner of the fourth aspect, in a twelfth possible implementation manner of the fourth aspect, the forwarding processing module is specifically configured to: when multiple other forwarding nodes exist between the forwarding node and the source device, if determining that the data packet carries the second interest packet, match the content name carried in the data packet with the content name in the PIT entry, and forward the data packet to a next forwarding node according to the port in the matched PIT entry, so that after receiving the data packet and when determining that the data packet carries the second interest packet, the next forwarding node matches the content name carried in the data packet with the content name in the PIT entry, and then forwards the data packet to a next forwarding node according to a port in the matched PIT entry, and so on, so as to forward the data packet to the source device.

According to a fifth aspect, a terminal device is provided, including:

a generating module, configured to generate a data packet according to a received first interest packet, where the first interest packet is forwarded by a source device via a forwarding node and is used by the source device to request content from the terminal device, where the forwarding node includes a pending information table (PIT), the PIT includes one or more PIT entries, and each PIT entry includes a content name and a port; and when forwarding the first interest packet, the forwarding node matches the first interest packet with the pending information table, so that the pending information table includes a PIT entry corresponding to the first interest packet;

an adding module, configured to: when it is determined that a second interest packet which is going to be sent to the source device needs to be carried in the data packet, carry the second interest packet in the data packet, where the second interest packet is used by the terminal device to request content from the source device; and a sending module, configured to send the data packet to the forwarding node, so that when determining that the data packet carries the second interest packet, the forwarding node matches a content name carried in the data packet with a content name in the PIT entry, and forwards the data packet to the source device according to a port in the matched PIT entry.

With reference to the fifth aspect, in a first possible implementation manner of the fifth aspect, the adding module is further configured to: when it is determined that the second interest packet which is going to be sent to the source device needs to be carried in the data packet, carry a piggyback interest identifier in the data packet, and set a value of the piggyback interest identifier to a value used to identify that the data packet carries the second interest packet, where the piggyback interest identifier is used to identify whether the data packet carries the second interest packet.

With reference to the fifth aspect or the first possible implementation manner of the fifth aspect, in a second possible implementation manner of the fifth aspect, there is one or more second interest packets.

With reference to the first possible implementation manner of the fifth aspect or the second possible implementation manner of the fifth aspect, in a third possible implementation manner of the fifth aspect, that the adding module is configured to carry the piggyback interest identifier in the data packet includes:

the adding module is specifically configured to carry the piggyback interest identifier in a digital signature information field of the data packet; or the adding module is specifically configured to add a first field to the data packet, and carry the piggyback interest identifier in the first field.

With reference to the fifth aspect, or the first possible implementation manner of the fifth aspect, or the second possible implementation manner of the fifth aspect, or the third possible implementation manner of the fifth aspect, in a fourth possible implementation manner of the fifth aspect, that the adding module is configured to carry the second interest packet in the data packet includes:

the adding module is specifically configured to add a second field before a data payload field to the data packet, and carry the second interest packet in the second field; or the adding module is specifically configured to add a third field after a data payload field to the data packet, and carry the second interest packet in the third field.

According to a sixth aspect, a terminal device is provided, including:

a receiving module, configured to receive a first data packet, where the first data packet is generated by a destination device according to a first interest packet of the terminal device and is forwarded via a forwarding node, where the first interest packet is used by the terminal device to request content from the destination device; the forwarding node includes a pending information table (PIT), the PIT includes one or more PIT entries, and each PIT entry includes a content name and a port; and after receiving the first data packet and determining that the first data packet carries a second interest packet, the forwarding node generates or updates a PIT entry corresponding to the second interest packet, where the second interest packet is used by the destination device to request content from the terminal device;

a generating module, configured to: when it is determined that the first data packet carries the second interest packet, acquire the second interest packet from the first data packet, and generate a second data packet according to the second interest packet, where the second data packet carries a content name that is the same as a content name of the content requested by using the second interest packet; and a sending module, configured to send the second data packet to the forwarding node, so that the forwarding node matches the content name carried in the second data packet with a content name in the PIT entry, and forwards the second data packet to the destination device according to a port in the matched PIT entry.

With reference to the sixth aspect, in a first possible implementation manner of the sixth aspect, the first data packet further carries a piggyback interest identifier that is used to identify whether the first data packet carries the second interest packet; and the generating module is specifically configured to: when it is determined, by determining a value of the piggyback interest identifier, that the first data packet carries the second interest packet, acquire the second interest packet from the first data packet, and generate the second data packet according to the second interest packet.

With reference to the sixth aspect or the first possible implementation manner of the sixth aspect, in a second possible implementation manner of the sixth aspect, the terminal device further includes: a content processing module, configured to acquire, from the first data packet, the content requested by using the first interest packet, and process the content.

With reference to the sixth aspect, or the first possible implementation manner of the sixth aspect, or the second possible implementation manner of the sixth aspect, in a third possible implementation manner of the sixth aspect, there is one or more second interest packets.

According to the packet processing method and the device provided in the embodiments of the present invention, when it is determined that a data packet carries a second interest packet, matching a content name carried in the data packet with a content name in a pending information table (PIT) entry is performed, and the data packet is forwarded to a source device according to the matched PIT entry, where the PIT entry corresponds to a first interest packet, and the PIT entry is included in a pending information table by matching the first interest packet with the pending information table when the received first interest packet is forwarded. In this way, the source device also receives an interest packet when receiving the data packet, thereby implementing sending of the interest packet from a destination device to the source device. It can be seen that, in the embodiments, an FIB table does not need to be queried hop by hop any longer, but a PIT table is used to implement forwarding of an interest packet when a data packet is forwarded, thereby improving efficiency of routing the interest packet.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
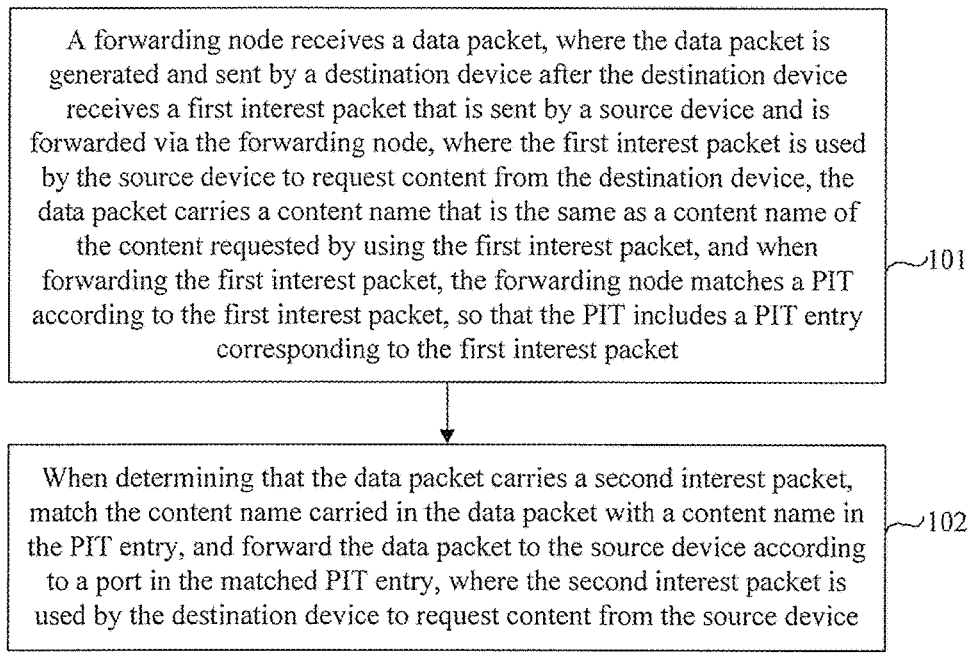
FIG. 1 is a flowchart of a packet processing method according to an embodiment of the present invention.

FIG. 1 is a flowchart of a packet processing method according to an embodiment of the present invention. The method provided in this embodiment is applied to a forwarding node in an ICN. The forwarding node includes a PIT, where the PIT includes one or more PIT entries, and each PIT entry includes a content name and a port. As shown in FIG. 1, the method includes:

101. The forwarding node receives a data packet, where the data packet is generated and sent by a destination device after the destination device receives a first interest packet that is sent by a source device and is forwarded via the forwarding node, where the first interest packet is used by the source device to request content from the destination device, the data packet carries a content name that is the same as a content name of the content requested by using the first interest packet, and when forwarding the first interest packet, the forwarding node matches the PIT according to the first interest packet, so that the PIT includes a PIT entry corresponding to the first interest packet.

The matching, by the forwarding node, the PIT according to the first interest packet, so that the PIT includes a PIT entry corresponding to the first interest packet includes: if a PIT entry which includes the content name of the content requested by using the first interest packet exists in the PIT, adding, to the PIT entry, information about a port through which the first interest packet is received; or if a PIT entry which includes the content name of the content requested by using the first interest packet does not exist in the PIT, adding, to the PIT, a PIT entry which includes the content name of the content requested by using the first interest packet and information about a port through which the first interest packet is received.

102. When determining that the data packet carries a second interest packet, match the content name carried in the data packet with a content name in the PIT entry, and forward the data packet to the source device according to a port in the matched PIT entry, where the second interest packet is used by the destination device to request content from the source device.

In this embodiment, the forwarding node in the network receives the data packet. The forwarding node may be a router or a routing node. Before sending the data packet, the destination device receives the first interest packet that is from the source device and is forwarded via the forwarding node. The first interest packet sent by the source device may be an independent packet, or may be carried in a data packet sent by the source device. After that, the destination device determines, according to the first interest packet, content that needs to be fed back to the source device, and generates the data packet. Before sending the data packet, the destination device may further determine, according to an actual application scenario and the like, whether an interest packet needs to be carried in the data packet; and if determining that the interest packet needs to be carried in the data packet, carry the second interest packet which is going to be sent to the source device in the data packet, and then send the data packet.

After receiving the data packet, the forwarding node may determine whether the received data packet carries the second interest packet; and when determining that the data packet carries the second interest packet, match the content name carried in the data packet with the content name in the PIT entry, and forward the data packet to the source device according to the port in the matched PIT entry. Specifically, when determining that the data packet carries the second interest packet, the forwarding node queries the local PIT according to the content name carried in the data packet; if a PIT entry is matched in the local PIT (that is, a PIT entry which includes the content name carried in the data packet exists in the local PIT), forwards the data packet from all ports in the matched PIT entry, additionally saves one copy of the data packet in a local CS, and removes the matched PIT entry from the local PIT after forwarding the data packet to the source device; and if no PIT entry is matched in the local PIT (that is, a PIT entry which includes the content name carried in the data packet does not exist in the local PIT), discards the data packet.

Further optionally, when determining that the data packet does not carry the second interest packet, the forwarding node may match the content name carried in the data packet with the content name in the PIT entry, and forward the data packet to the source device according to the port in the matched PIT entry. In this way, when receiving the data packet, the source device can also receive the second interest packet sent by the destination device, so that the destination device no longer needs to separately send the interest packet, which may save resources.

In this embodiment, after receiving the data packet and determining that the data packet carries the second interest packet, the forwarding node further generates or updates a PIT entry corresponding to the second interest packet. A time point of generating or updating the PIT entry corresponding to the second interest packet is not limited in this embodiment, and may be any time point after it is determined that the data packet carries the second interest packet and before a data packet which the source device sends in response to the second interest packet is received.

The generating or updating, by the forwarding node, a PIT entry corresponding to the second interest packet includes: querying the PIT according to a content name in the second interest packet; and if a PIT entry which includes the content name in the second interest packet exists in the PIT, which indicates that there has been an interest packet that requests same content, then adding, to the PIT entry which includes the content name in the second interest packet, information about a port through which the data packet is received, so as to update the PIT entry corresponding to the second interest packet; or if a PIT entry which includes the content name in the second interest packet does not exist in the PIT, adding, to the PIT, a PIT entry which includes the content name in the second interest packet and information about a port through which the data packet is received, so as to generate the PIT entry corresponding to the second interest packet. Herein, the port through which the forwarding node receives the data packet is a port through which the second interest packet is received (namely, an incoming port of the second interest packet).

It is noted herein that a process of performing forwarding processing, by the forwarding node, on the data packet according to the local PIT and a process of generating or updating, by the forwarding node, the PIT entry corresponding to the second interest packet are not limited in terms of a sequence, and both may be concurrently executed.

It can be seen from the foregoing description that, in this embodiment, when it is determined that a data packet carries a second interest packet, matching of a content name carried in the data packet with a content name in a pending information table PIT entry is performed, and the data packet is forwarded to a source device according to the matched PIT entry, where the PIT entry corresponds to a first interest packet, and the PIT entry is included in a PIT by matching the PIT according to the first interest packet when the received first interest packet is forwarded. In this way, the source device also receives an interest packet when receiving the data packet, thereby sending of the interest packet from a destination device to the source device is achieved. An FIB table does not need to be queried hop by hop any longer to send an interest packet, but a PIT table is used to forward the interest packet at the time when a data packet is forwarded, thereby improving efficiency of routing the interest packet.

In one optional implementation manner of the present invention, the data packet may further carry a piggyback interest identifier that is used to identify whether the data packet carries the second interest packet. A manner of carrying the piggyback interest identifier in the data packet includes but is not limited to: carrying the piggyback interest identifier in a digital signature information (Signed Info) field of the data packet; or carrying the piggyback interest identifier in a field other than a digital signature information field of the data packet, for example, adding a first field to the data packet, and carrying the piggyback interest identifier in the first field.

Based on the foregoing piggyback interest identifier, after receiving the data packet, the forwarding node may determine, by determining a value of the piggyback interest identifier carried in the data packet, whether the data packet carries the second interest packet. Based on this, one implementation manner of step 102 is: when determining, by determining the value of the piggyback interest identifier, that the data packet carries the second interest packet, match the content name carried in the data packet with the content name in the PIT entry, and forward the data packet to the source device according to the port in the matched PIT entry.

In the embodiments of the present invention, the data packet may carry one or more second interest packets.

A manner of carrying the second interest packet in the data packet includes but is not limited to: carrying the second interest packet in front of a data payload (Data Payload) field of the data packet, for example, adding a second field in front of the data payload field to the data packet, and carrying the second interest packet in the second field; or carrying the second interest packet behind a data payload field of the data packet, for example, adding a third field behind the data payload field to the data packet, and carrying the second interest packet in the third field.

Figure 2:
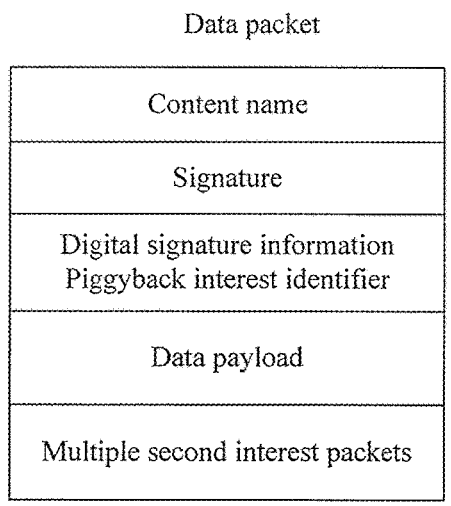
FIG. 2 is a schematic diagram showing a manner of carrying a piggyback interest identifier and a second interest field in a data packet according to an embodiment of the present invention.
Figure 3:
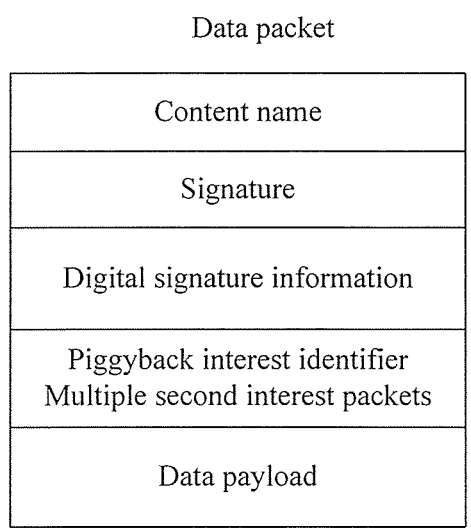
FIG. 3 is a schematic diagram showing another manner of carrying a piggyback interest identifier and a second interest field in a data packet according to an embodiment of the present invention.

For example, FIG. 2 shows a manner of carrying both a piggyback interest identifier and a second interest packet in a data packet. The piggyback interest identifier is carried in a digital signature information field of the data packet, and multiple second interest packets are carried in a field added behind a data payload field. For another example, FIG. 3 shows another manner of carrying both a piggyback interest identifier and a second interest packet in a data packet. Both the piggyback interest identifier and multiple second interest packets are carried in a field added in front of a data payload field to the data packet.

In one optional implementation manner of the present invention, when determining that the data packet carries the second interest packet and before matching the content name carried in the data packet with the content name in the PIT entry, and forwarding the data packet to the source device according to the port in the matched PIT entry, the forwarding node may query the local CS according to the content name in the second interest packet, and determine that content corresponding to the content name in the second interest packet does not exist in the local CS.

Further optionally, before matching the content name carried in the data packet with the content name in the PIT entry, and forwarding the data packet to the source device according to the port in the matched PIT entry, if it is determined that the content corresponding to the content name in the second interest packet exists in the local CS, the content that is in the local CS and corresponds to the content name in the second interest packet is sent through the port through which the data packet is received.

That is, in the implementation manner, when receiving the data packet and determining that the data packet carries the second interest packet, the forwarding node may first query the local CS according to the content name in the second interest packet, and determine whether the content corresponding to the content name in the second interest packet exists in the local CS; and if the content corresponding to the content name in the second interest packet does not exist in the local CS, match the content name carried in the data packet with the content name in the PIT entry, and forward the data packet to the source device according to the port in the matched PIT entry; or if the content corresponding to the content name in the second interest packet exists in the local CS, send, through the port through which the data packet is received, the content that is in the local CS and corresponds to the content name in the second interest packet, match the content name carried in the data packet with the content name in the PIT entry, and forward the data packet to the source device according to the port in the matched PIT entry.

In a case in which it is determined that the content corresponding to the content name in the second interest packet exists in the local CS, one implementation manner of the sending, through the port through which the data packet is received, the content that is in the local CS and corresponds to the content name in the second interest packet, matching the content name carried in the data packet with the content name in the PIT entry, and forwarding the data packet to the source device according to the port in the matched PIT entry may include: sending, through the port through which the data packet is received, the content that is in the local CS and corresponds to the content name in the second interest packet, deleting the second interest packet from the data packet, matching the content name carried in the data packet with the content name in the PIT entry, and forwarding, to the source device according to the port in the matched PIT entry, the data packet from which the second interest packet is deleted, which may reduce a transmission load and save transmission resources.

It is noted herein that, although the second interest packet in the data packet is deleted herein, that is, content of the data packet changes, but the name "data packet" is still used.

In this embodiment of the present invention, multiple other forwarding nodes or no other forwarding node may exist between the forwarding node (namely, the entity that performs this embodiment) that receives the data packet and the source device. When multiple other forwarding nodes exist between the forwarding node that receives the data packet and the source device, in the foregoing embodiments or implementation manners, the forwarding, by the forwarding node, the data packet to the source device according to the port in the matched PIT entry includes:

forwarding the data packet to a next forwarding node according to the port in the matched PIT entry, so that after receiving the data packet and when determining that the data packet carries the second interest packet, the next forwarding node matches the content name carried in the data packet with the content name in the PIT entry, and then forwards the data packet to a next forwarding node according to a port in the matched PIT entry, and so on, so as to forward the data packet to the source device. It can be seen that, when multiple other forwarding nodes exist between a source device and a forwarding node that receives a data packet, each forwarding node processes the received data packet in a same manner.

Figure 4:
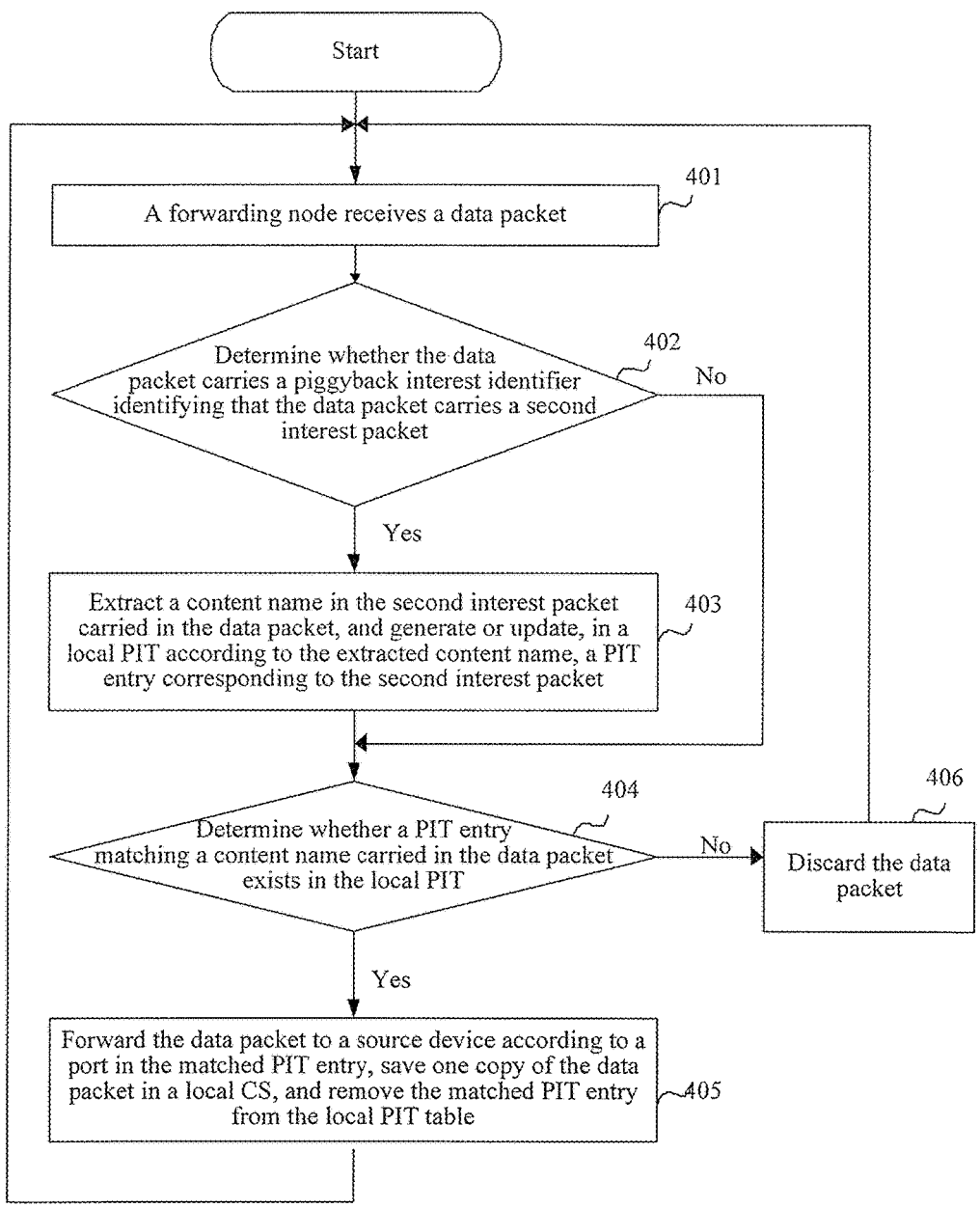
FIG. 4 is a flowchart of another packet processing method according to an embodiment of the present invention.

FIG. 4 is a flowchart of another packet processing method according to an embodiment of the present invention. The method provided in this embodiment is applied to a forwarding node in an ICN. The forwarding node includes a PIT, where the PIT includes one or more PIT entries, and each PIT entry includes a content name and a port. As shown in FIG. 4, the method includes:

401. The forwarding node receives a data packet, where the data packet is generated and sent by a destination device after the destination device receives a first interest packet that is sent by a source device and is forwarded via the forwarding node, where the first interest packet is used by the source device to request content from the destination device, the data packet carries a content name that is the same as a content name of the content requested by using the first interest packet, and when forwarding the first interest packet, the forwarding node matches the PIT according to the first interest packet, so that the PIT includes a PIT entry corresponding to the first interest packet.

For step 401, refer to the description of the foregoing step 101.

402. Determine whether the data packet carries a piggyback interest identifier which identifies that the data packet carries a second interest packet; and if a result of the determining is yes, execute step 403; or if a result of the determining is no, execute step 404.

For example, the forwarding node may parse the data packet to determine whether the data packet carries the piggyback interest identifier, and determine, according to a value of the piggyback interest identifier, whether the data packet carries the second interest packet. The second interest packet is used by the destination device to request content from the source device.

Step 403. Extract a content name in the second interest packet carried in the data packet, generate or update, according to the extracted content name, a PIT entry corresponding to the second interest packet in the local PIT, and execute step 404.

The forwarding node determines, according to the extracted content name, whether a PIT entry which includes the extracted content name exists in the local PIT; and if the PIT entry which includes the extracted content name already exists in the local PIT, adds, to the PIT entry, a port through which the data packet is received, so as to update the PIT entry corresponding to the second interest packet; or if the PIT entry which includes the extracted content name does not exist in the local PIT, adds, to the local PIT, the extracted content name and information about a port through which the data packet is received, so as to generate the PIT entry corresponding to the second interest packet.

404. Determine, according to a content name carried in the data packet, whether a PIT entry matching the content name carried in the data packet exists in the local PIT; and if a result of the determining is yes, execute step 405; or if a result of the determining is no, execute step 406.

405. Forward the data packet to the source device according to a port in the matched PIT entry, save one copy of the data packet in a local CS, remove the matched PIT entry from the local PIT table, and execute step 401.

406. Discard the data packet, and execute step 401.

An execution sequence of the foregoing steps 402 and 403 and steps 404 to 406 is not limited.

It is noted herein that, when the received data packet does not carry the piggyback interest identifier, step 404 to step 406 are executed. The process is the same as a process of forwarding and processing a received data packet in an existing NDN, that is, the method provided in this embodiment may be compatible with a routing and forwarding solution of the existing NDN.

Figure 5:
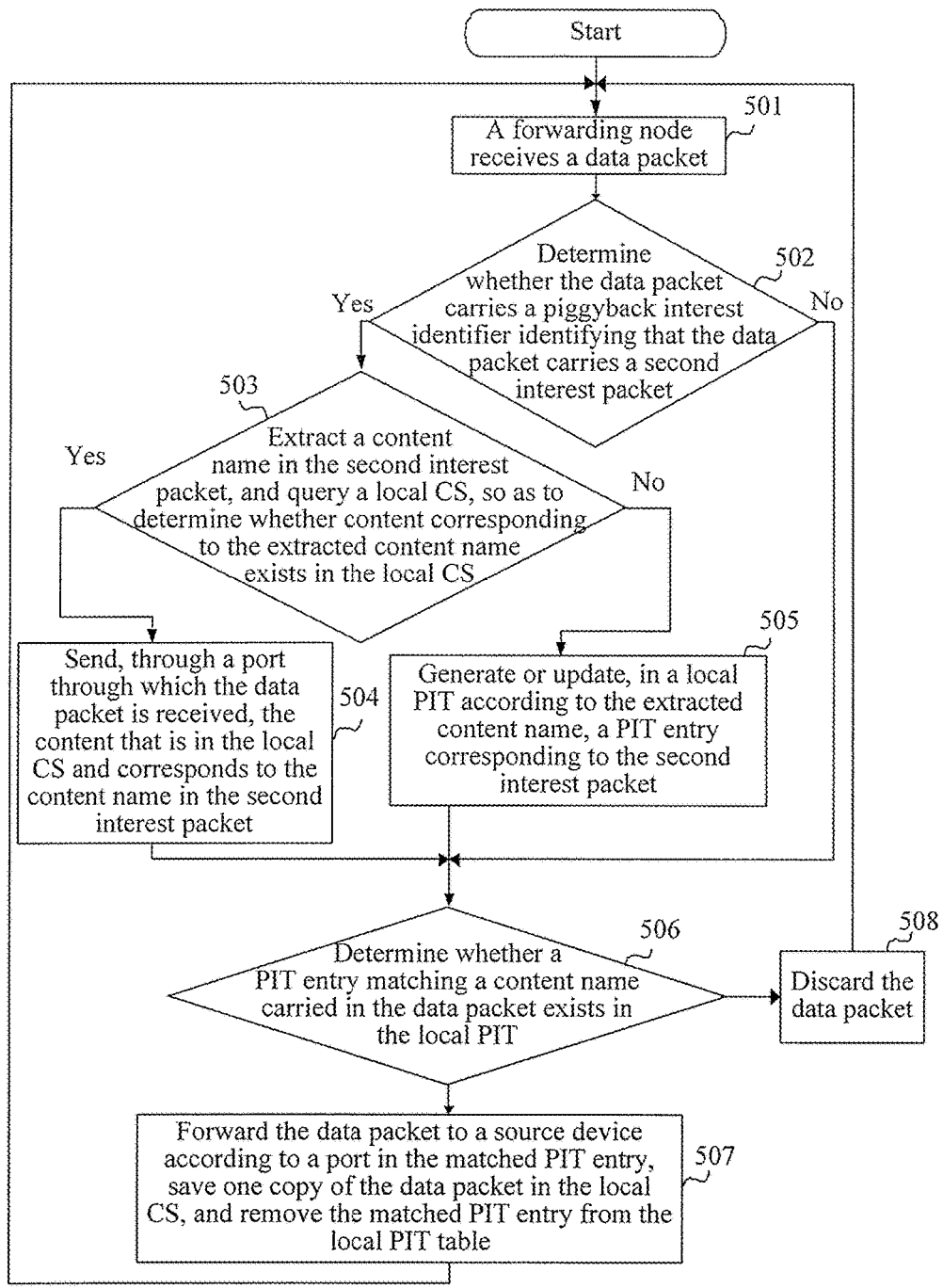
FIG. 5 is a flowchart of still another packet processing method according to an embodiment of the present invention.

FIG. 5 is a flowchart of still another packet processing method according to an embodiment of the present invention. The method provided in this embodiment is applied to a forwarding node in an ICN. The forwarding node includes a PIT, where the PIT includes one or more PIT entries, and each PIT entry includes a content name and a port. As shown in FIG. 5, the method includes:

501. The forwarding node receives a data packet, where the data packet is generated and sent by a destination device after the destination device receives a first interest packet that is sent by a source device and is forwarded via the forwarding node, where the first interest packet is used by the source device to request content from the destination device, the data packet carries a content name that is the same as a content name of the content requested by using the first interest packet, and when forwarding the first interest packet, the forwarding node matches the PIT according to the first interest packet, so that the PIT includes a PIT entry corresponding to the first interest packet.

502. Determine whether the data packet carries a piggyback interest identifier identifying that the data packet carries a second interest packet; and if a result of the determining is yes, execute step 503; or if a result of the determining is no, execute step 506.

503. Extract a content name in the second interest packet carried in the data packet, query a local CS according to the extracted content name to determine whether content corresponding to the extracted content name exists in the local CS; and if a result of the determining is yes, execute step 504; or if a result of the determining is no, execute step 505.

504. Send, through a port through which the data packet is received, the content that is in the local CS and corresponds to the content name in the second interest packet, and execute step 506.

505. Generate or update, in the local PIT according to the extracted content name, a PIT entry corresponding to the second interest packet, and execute step 506.

506. Determine, according to the content name carried in the data packet, whether a PIT entry matching the content name carried in the data packet exists in the local PIT; and if a result of the determining is yes, execute step 507; or if a result of the determining is no, execute step 508.

507. Forward the data packet to the source device according to a port in the matched PIT entry, save one copy of the data packet in the local CS, remove the matched PIT entry from the local PIT table, and execute step 501.

508. Discard the data packet, and execute step 501.

A difference between this embodiment and the embodiment shown in FIG. 4 may be summarized as follows: When the data packet carries the second interest packet, before matching the content name carried in the data packet with a content name in the PIT entry, and forwarding the data packet to the source device according to the port in the matched PIT entry, the method further includes: querying the local CS according to the content name in the second interest packet, and determining whether the content corresponding to the content name in the second interest packet exists in the local CS. If a result of the determining indicates that does not exist, that is, it is determined that the content corresponding to the content name in the second interest packet does not exist in the local CS, when the data packet carries the second interest packet, matching of the content name carried in the data packet with the content name in the PIT entry is performed, and the data packet is forwarded to the source device according to the port in the matched PIT entry; and if a result of the determining indicates that exists, that is, it is determined that the content corresponding to the content name in the second interest packet exists in the local CS, the content that is in the local CS and corresponds to the content name in the second interest packet is sent through the port through which the data packet is received, and when the data packet carries the second interest packet, matching of the content name carried in the data packet with the content name in the PIT entry is performed, and the data packet is forwarded to the source device according to the port in the matched PIT entry.

When the content corresponding to the content name in the second interest packet exists in the local CS, the foregoing forwarding the data packet to the source device according to the port in the matched PIT entry may be implemented in multiple manners, and one of the multiple manners is provided in steps 506 to 508 in this embodiment. For example, when the content corresponding to the content name in the second interest packet exists in the local CS, the forwarding node has sent the content that is in the local CS and corresponds to the content name in the second interest packet through the port through which the data packet is received. Therefore, the source device may no longer need to return the content corresponding to the content name in the second interest packet to the destination device. Based on this, the forwarding node may further delete the second interest packet from the data packet, and then forward, to the source device according to the port in the matched PIT entry, the data packet from which the second interest packet is deleted.

It can be seen from the foregoing description that, in this embodiment of the present invention, a piggyback interest (Piggyback Interest) identifier is carried in a data packet to identify whether an interest packet is carried. After receiving the data packet, a forwarding node sends, to a destination according to a PIT entry that is stored in a local PIT and matches a content name carried in the data packet, both the data packet and the interest packet carried in the data packet. In this way, an FIB is no longer queried hop by hop for routing the interest packet, thereby improving efficiency of routing the interest packet. In addition, when the data packet carries the interest packet, the forwarding node further establishes, in the local PIT, a corresponding PIT entry for the interest packet in the data packet, which also provides, when ensuring that the interest packet successfully reaches a source device, a reverse path for a data packet that is sent by the source device in response to the interest packet, thereby ensuring normal communication between devices at two ends.

In an application of an end-to-end type, an interest packet and a data packet are usually exchanged between a specific sending party and a specific receiving party. Therefore, the method provided in this embodiment of the present invention is particularly applied but is not limited to an application of an end-to-end type. In addition, for an application of an end-to-end type, the method provided in this embodiment of the present invention not only may improve efficiency of routing an interest packet, but also may decrease a network delay of an end-to-end service because there is no need to query an FIB for routing the interest packet, and therefore the routing of the interest packet is not affected by route convergence caused by a route change (for example, a terminal moves), which prevents a delay caused by route convergence from affecting the end-to-end service. In addition, for a large quantity of end-to-end applications, content names generated by the applications are characterized by instantaneity and randomness, and are large in quantity. However, in the method provided in this embodiment of the present invention, not all content names generated in end-to-end applications need to be added to an FIB, thereby reducing an expansion pressure of the FIB.

Figure 6:
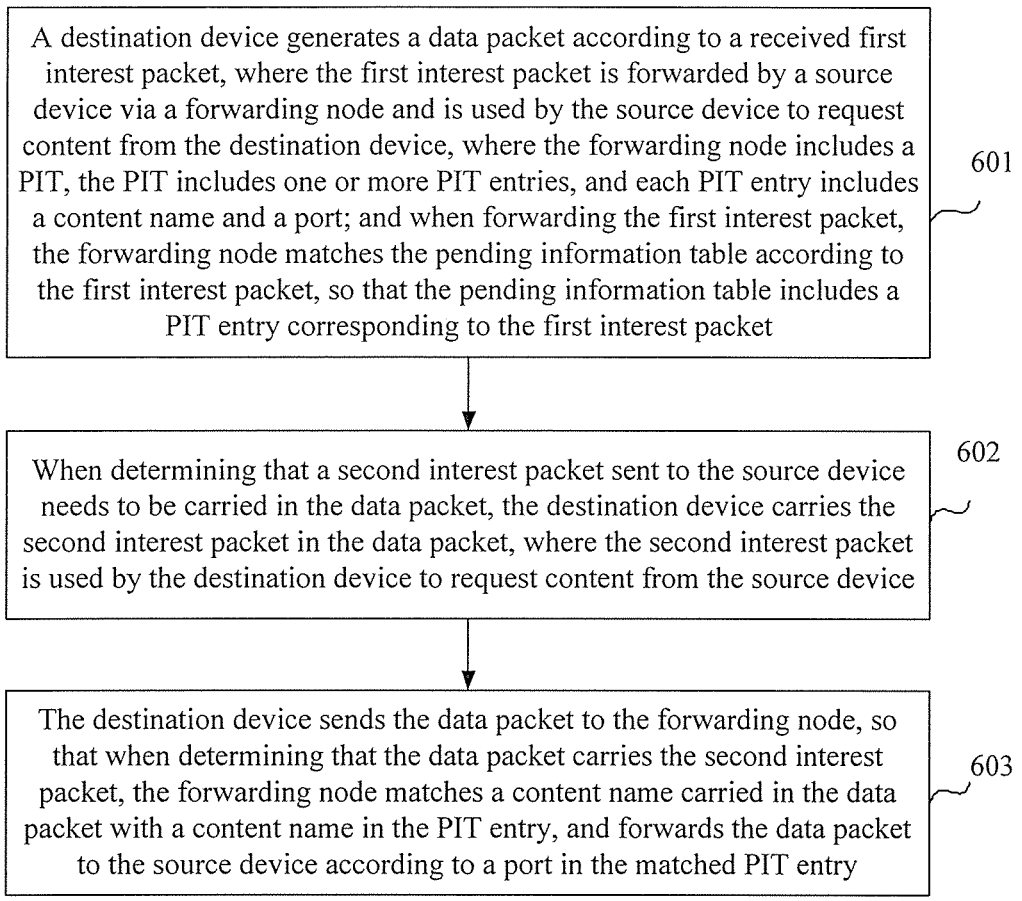
FIG. 6 is a flowchart of still another packet processing method according to an embodiment of the present invention.

FIG. 6 is a flowchart of still another packet processing method according to an embodiment of the present invention. As shown in FIG. 6, the method includes:

601. A destination device generates a data packet according to a received first interest packet, where the first interest packet is forwarded by a source device via a forwarding node and is used by the source device to request content from the destination device, where the forwarding node includes a PIT, the PIT includes one or more PIT entries, and each PIT entry includes a content name and a port; and when forwarding the first interest packet, the forwarding node matches the first interest packet with the pending information table, so that the pending information table includes a PIT entry corresponding to the first interest packet.

602. When determining that a second interest packet which is going to be sent to the source device needs to be carried in the data packet, the destination device carries the second interest packet in the data packet, where the second interest packet is used by the destination device to request content from the source device.

603. The destination device sends the data packet to the forwarding node, so that when determining that the data packet carries the second interest packet, the forwarding node matches a content name carried in the data packet with a content name in the PIT entry, and forwards the data packet to the source device according to a port in the matched PIT entry.

This embodiment provides description from a perspective of the destination device.

Specifically, the destination device receives the first interest packet forwarded by the source device via the forwarding node, prepares related content according to a content name in the first interest packet, and generates the data packet carrying the content, where the data packet further carries a content name of the content requested by using the first interest packet. Then the destination device determines whether the second interest packet which is going to be sent to the source device needs to be carried in the data packet; if determining that the second interest packet needs to be carried, carries the second interest packet in the data packet, and then sends the data packet to the forwarding node; and if determining that the second interest packet does not need to be carried, directly sends the data packet to the forwarding node after generating the data packet.

The destination device may determine, according to an actual application scenario, whether the second interest packet which is going to be sent to the source device needs to be carried in the data packet. For example, if the destination device further needs to acquire other content from the source device, the destination device determines that the second interest packet which is going to be sent to the source device needs to be carried in the data packet; otherwise, the destination device determines that the second interest packet does not need to be carried.

When forwarding the first interest packet to a destination node, the forwarding node matches the PIT according to the first interest packet, so that the PIT includes the PIT entry corresponding to the first interest packet. Based on this, after receiving the data packet sent by the destination device, the forwarding node performs matching in the PIT entry according to the content name carried in the data packet, and forwards the data packet to the source device according to the port in the matched PIT entry. In this process, if the data packet carries the second interest packet, the second interest packet, along with the data packet, is forwarded to the source device.

The destination device may carry one or more second interest packets in the data packet. In other words, there may be one or more second interest packets.

In one optional implementation manner of this embodiment, the method further includes: when determining that the second interest packet which is going to be sent to the source device needs to be carried in the data packet, the destination device carries a piggyback interest identifier in the data packet, and sets a value of the piggyback interest identifier to a value used to identify that the data packet carries the second interest packet. The piggyback interest identifier is used to identify whether the data packet carries the second interest packet. In this implementation manner, the destination device identifies, by using the piggyback interest identifier, whether the data packet carries the second interest packet. For example, the value of the piggyback interest identifier may be set to 1 to identify that the data packet carries the second interest packet, and the value of the piggyback interest identifier is set to 0 to identify that the data packet does not carry the second interest packet, which is not limited.

Optionally, carrying, by the destination device, the piggyback interest identifier in the data packet includes but is not limited to: carrying the piggyback interest identifier in a digital signature information (Signed Info) field of the data packet; or carrying the piggyback interest identifier in a field other than a digital signature information field of the data packet, for example, adding a first field to the data packet, and carrying the piggyback interest identifier in the first field.

Optionally, carrying, by the destination device, the second interest packet in the data packet includes but is not limited to: carrying the second interest packet in front of a data payload (Data Payload) field of the data packet, for example, adding a second field in front of the data payload field to the data packet, and carrying the second interest packet in the second field; or carrying the second interest packet behind a data payload field of the data packet, for example, adding a third field behind the data payload field to the data packet, and carrying the second interest packet in the third field. For example, a manner of carrying a piggyback interest identifier and a second interest field in a data packet may be shown in FIG. 2 and FIG. 3.

In this embodiment, when returning a data packet to a source device according to a first interest packet sent by the source device, a destination device carries a second interest packet which is going to be to sent to the source device in the data packet, so that a forwarding node in a network can forward, based on a port in a PIT entry that is in a PIT and matches a content name carried in the data packet, both the data packet and the second interest packet to the source device, thereby providing a prerequisite for improving efficiency of successfully sending an interest packet in an information centric network, decreasing a processing overhead of the forwarding node, and reducing a data exchange delay.

Figure 7:
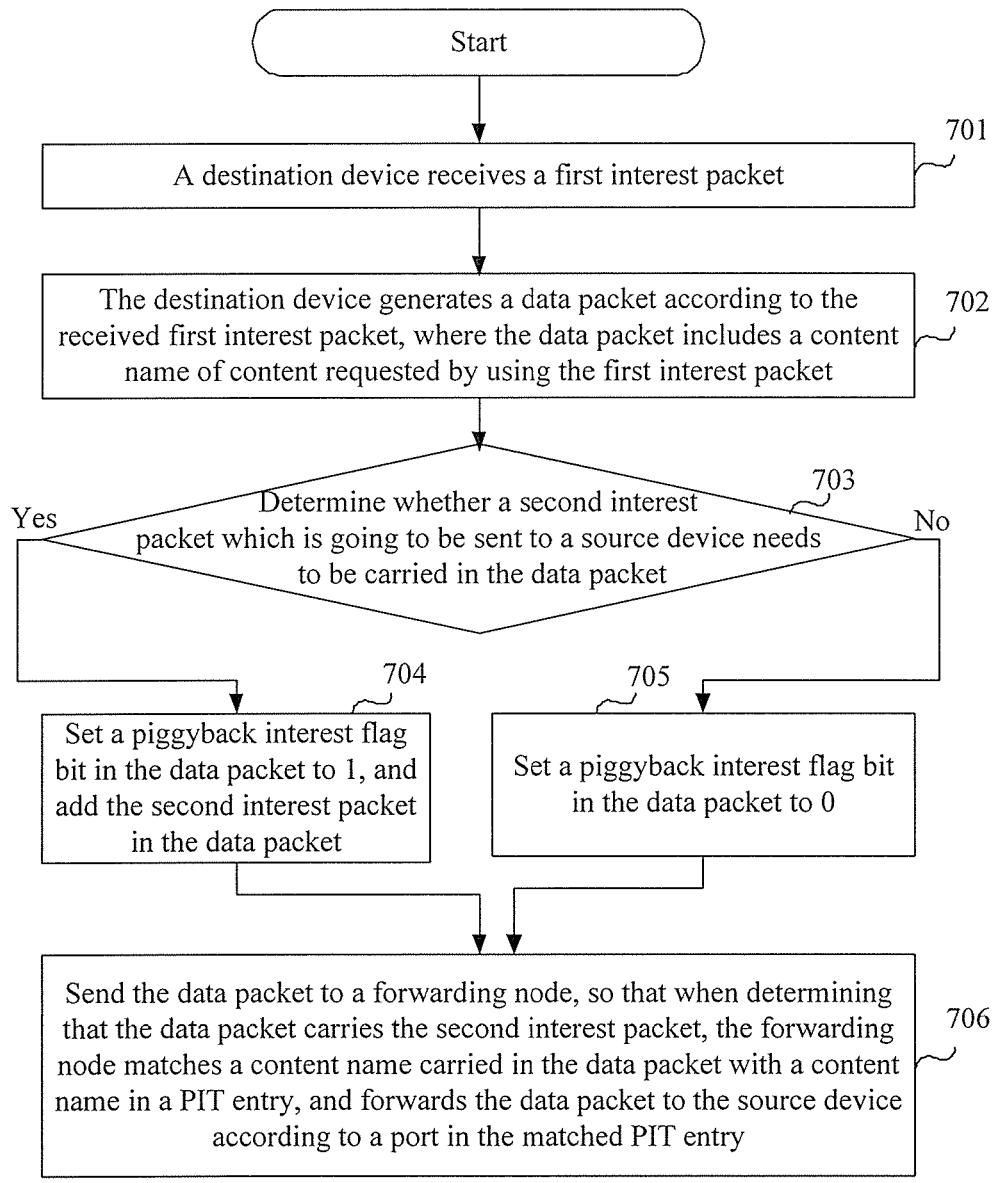
FIG. 7 is a flowchart of still another packet processing method according to an embodiment of the present invention.

FIG. 7 is a flowchart of still another packet processing method according to an embodiment of the present invention. As shown in FIG. 7, the method includes:

701. A destination device receives a first interest packet, where the first data packet is generated by the destination device according to the first interest packet of the source device and is forwarded via a forwarding node, and the first interest packet is used by the source device to request content from the destination device.

The forwarding node includes a PIT, where the PIT includes one or more PIT entries, and each PIT entry includes a content name and a port; and when forwarding the first interest packet, the forwarding node matches the PIT according to the first interest packet, so that the PIT includes a PIT entry corresponding to the first interest packet.

702. The destination device generates a data packet according to the received first interest packet, where the data packet includes a content name of the content requested by using the first interest packet.

703. Determine whether a second interest packet which is going to be sent to the source device needs to be carried in the data packet; and if a result of the determining is yes, execute step 704; or if a result of the determining is no, execute step 705.

704. Set a piggyback interest flag bit in the data packet to 1, and add the second interest packet to the data packet, where the piggyback interest flag bit is used to identify whether the data packet carries the second interest packet. When a value is 1, it identifies that the data packet carries the second interest packet; and when a value is 0, it identifies that the data packet does not carry the second interest packet, and step 706 is executed.

705. Set a piggyback interest flag bit in the data packet to 0, and execute step 706.

706. Send the data packet to the forwarding node, so that when determining that the data packet carries the second interest packet, the forwarding node matches a content name carried in the data packet with a content name in the PIT entry, and forwards the data packet to the source device according to a port in the matched PIT entry.

In this embodiment, when returning a data packet to a source device according to a first interest packet sent by the source device, a destination device carries a second interest packet which is going to be sent to the source device in the data packet, so that a forwarding node in a network can forward, based on a port in a PIT entry that is in a PIT and matches a content name carried in the data packet, both the data packet and the second interest packet to the source device, thereby providing a prerequisite for improving efficiency of successfully sending an interest packet in an information centric network, decreasing a processing overhead of the forwarding node, and reducing a data exchange delay.

Figure 8:
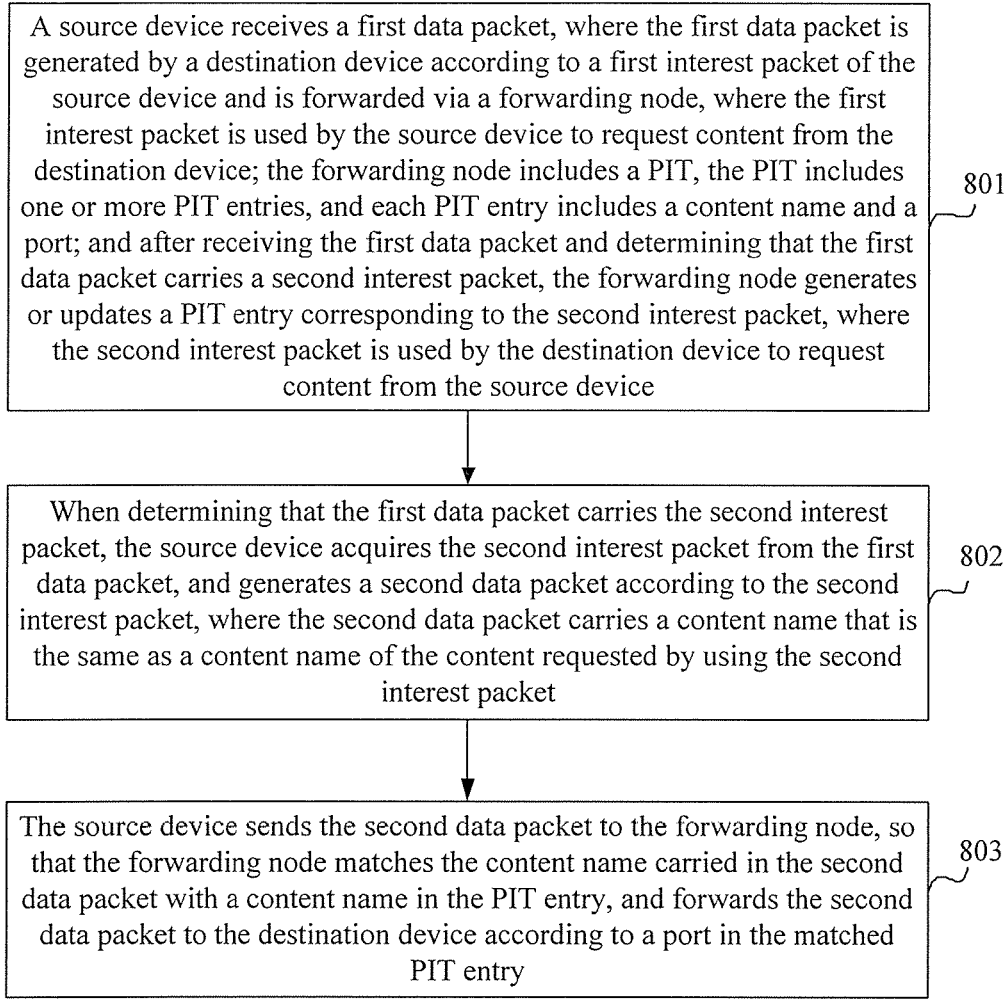
FIG. 8 is a flowchart of still another packet processing method according to an embodiment of the present invention.

FIG. 8 is a flowchart of still another packet processing method according to an embodiment of the present invention. As shown in FIG. 8, the method includes:

801. A source device receives a first data packet, where the first data packet is generated by a destination device according to a first interest packet of the source device and is forwarded via a forwarding node, where the first interest packet is used by the source device to request content from the destination device; the forwarding node includes a PIT, the PIT includes one or more PIT entries, and each PIT entry includes a content name and a port; and after receiving the first data packet and determining that the first data packet carries a second interest packet, the forwarding node generates or updates a PIT entry corresponding to the second interest packet, where the second interest packet is used by the destination device to request content from the source device.

802. When determining that the first data packet carries the second interest packet, the source device acquires the second interest packet from the first data packet, and generates a second data packet according to the second interest packet, where the second data packet carries a content name that is the same as a content name of the content requested by using the second interest packet.

803. The source device sends the second data packet to the forwarding node, so that the forwarding node matches the content name carried in the second data packet with a content name in the PIT entry, and forwards the second data packet to the destination device according to a port in the matched PIT entry.

This embodiment provides description from a perspective of the source device.

Specifically, the source device receives the first data packet that is returned by the destination device in response to the first interest packet sent by the source device; determines whether the first data packet carries the second interest packet; and if a result of the determining is yes, acquires the second interest packet from the first data packet, determines related content according to the content name in the second interest packet, generates the second data packet, and sends the second data packet to the forwarding node, so that the forwarding node forwards the second data packet to the destination device according to the PIT entry that is in the PIT and corresponds to the second interest packet.

Further, the source device may further acquire, from the first data packet, the content requested by using the first interest request packet, and process the content, for example, the source device may submit the content to an application program for processing. For a process of sending, by the source device, the second data packet to the destination device according to the second interest packet acquired from the first data packet, refer to FIG. 6 or FIG. 7, or a processing process in the prior art may be used.

Further, if the first data packet does not carry the second interest packet, reception processing may be performed on the first data packet according to an existing process, for example, the content requested by using the first interest packet may be acquired from the first data packet, and then related processing is performed on the content.

Optionally, if the first data packet carries multiple second interest packets, a same manner is used to process each second interest packet.

In one optional implementation manner of this embodiment, the first data packet further carries a piggyback interest identifier that is used to identify whether the first data packet carries the second interest packet. Based on this, the source device may determine, by determining a value of the piggyback interest identifier carried in the first data packet, whether the first data packet carries the second interest packet. Based on this, one implementation manner of step 802 includes that: when determining, by determining the value of the piggyback interest identifier, that the first data packet carries the second interest packet, the source device acquires the second interest packet from the first data packet, and generates the second data packet according to the second interest packet.

In this embodiment, a source device performs determining on a first data packet that is returned by a destination device according to a first interest packet of the source device; and when determining that the first data packet carries a second interest packet, acquires the carried second interest packet from the first data packet, and performs processing according to the acquired second interest packet, thereby providing support for improving efficiency of successfully sending an interest packet in an information centric network, decreasing a processing overhead of a forwarding node, reducing a data exchange delay, and the like.

A method of carrying an interest packet in a data packet in this embodiment of the present invention includes: adding a piggyback interest flag bit to a data packet, where the piggyback interest flag bit is used to identify whether the data packet carries an interest packet; and when it is identified, by using the piggyback interest flag bit, that the data packet carries the interest packet, carrying, in the data packet, the interest packet that is going to be sent by a sending end of the data packet to a receiving end of the data packet.

The data packet may carry one or more interest packets.

Optionally, the piggyback interest flag bit may be located in a digital signature information field of the data packet; or the piggyback interest flag bit may be located in a first field added to the data packet.

Optionally, the interest packet may be located in a second field that is in the data packet and is added in front of a data payload field; or the interest packet may be located in a third field that is in the data packet and is added behind a data payload field.

The method may be applied to the foregoing packet processing method embodiment and provides a specific manner of carrying an interest packet in a data packet for the foregoing embodiment.

The following further describes, by using several specific application scenarios, the method provided in the embodiments of the present invention and a beneficial effect brought from the packet processing method provided in the embodiments of the present invention.

Figure 9:
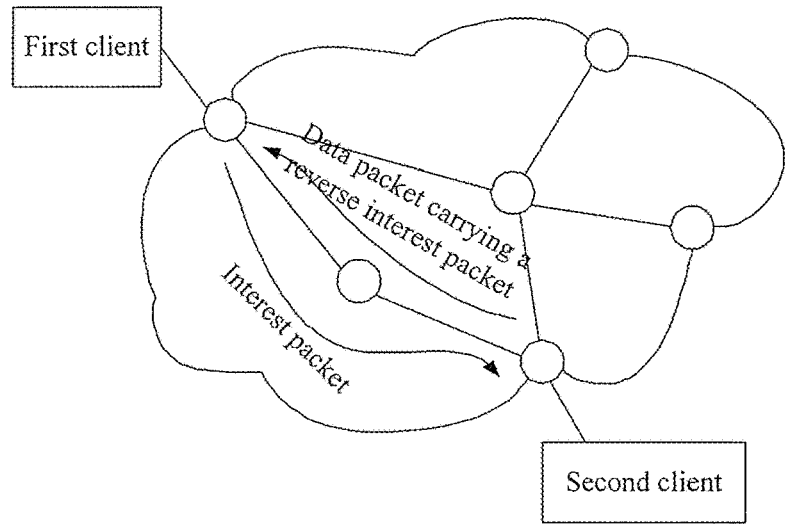
FIG. 9 is a schematic diagram of an end-to-end application scenario according to an embodiment of the present invention.

FIG. 9 is a schematic diagram of an end-to-end application scenario according to an embodiment of the present invention. As shown in FIG. 9, a first client and a second client are connected through an NDN. Six routing devices exist in the NDN, as shown in circles in FIG. 9. For an interconnection relationship among the six routing devices, refer to FIG. 9. The routing device in FIG. 9 may be used as the forwarding node in the foregoing embodiments. When positions of the first client and the second client are fixed, a session process between the first client and the second client includes:

9a. The first client initiates a session with the second client, and sends a first interest packet including a related content name.

9b. A routing device in the network routes the first interest packet to the second client by using an FIB. This step is the same as a solution in the prior art. In this step, a reverse path of a data packet corresponding to the first interest packet, namely, a PIT entry corresponding to the first interest packet, is formed in a local PIT of the routing device.

9c. After receiving the first interest packet, the second client prepares a to-be-returned data packet, sets a piggyback interest identifier in the data packet to 1 because of an end-to-end session feature of the application, and adds a to-be-returned second interest packet to the data packet.

9d. The second client sends the data packet, so that the data packet carrying the second interest packet is returned to the first client along the reverse path formed in the PIT of the routing device in the network. For a specific implementation process of this step, refer to the descriptions of the embodiments shown in FIG. 1 to FIG. 5. There is no need to query the FIB hop by hop in this process, which is conducive to improving efficiency of routing an interest packet.

9e. The first client may continue to send, to the second client, a data packet carrying a third interest packet, and so on, till the session ends.

It is assumed that the first client moves. In this case, a session process between the first client and the second client includes:

10a. Session data is properly sent between the first client and the second client.

10b. After sending a data packet carrying a first interest packet (namely, Data+Interest), the first client moves to another place.

10c. After receiving the data packet carrying the first interest packet, the second client prepares a to-be-returned data packet carrying a second interest packet, and sends the data packet, so that the data packet carrying the second interest packet is returned to the first client according to a reverse path formed in a PIT of a routing device. However, because the first client has moved, the data packet carrying the second interest packet cannot reach the first client. For details about this step, refer to the descriptions of the embodiments shown in FIG. 1 to FIG. 5.

10d. After timeout time corresponding to the first interest packet ends, if the data packet returned by the second client is still not received, the first client resends the first interest packet.

10e. After receiving the first interest packet that is resent, the second client prepares the to-be-returned data packet carrying the second interest packet, and sends the data packet, so that the data packet carrying the second interest packet is returned to the first client according to a new reverse path formed in the PIT. In this case, the first client receives the data packet carrying the second interest packet. For details about this step, refer to the descriptions of the embodiments shown in FIG. 1 to FIG. 5.

In this scenario, using the method provided in this embodiment of the present invention may not only improve efficiency of routing an interest packet, but also ensure that, after a first client moves, a second interest packet sent by a second client to the first client can reach the first client without waiting until routing information of the first client is updated in FIBs in an entire network, thereby greatly decreasing a delay, and reducing an additional routing overhead.

Figure 10:
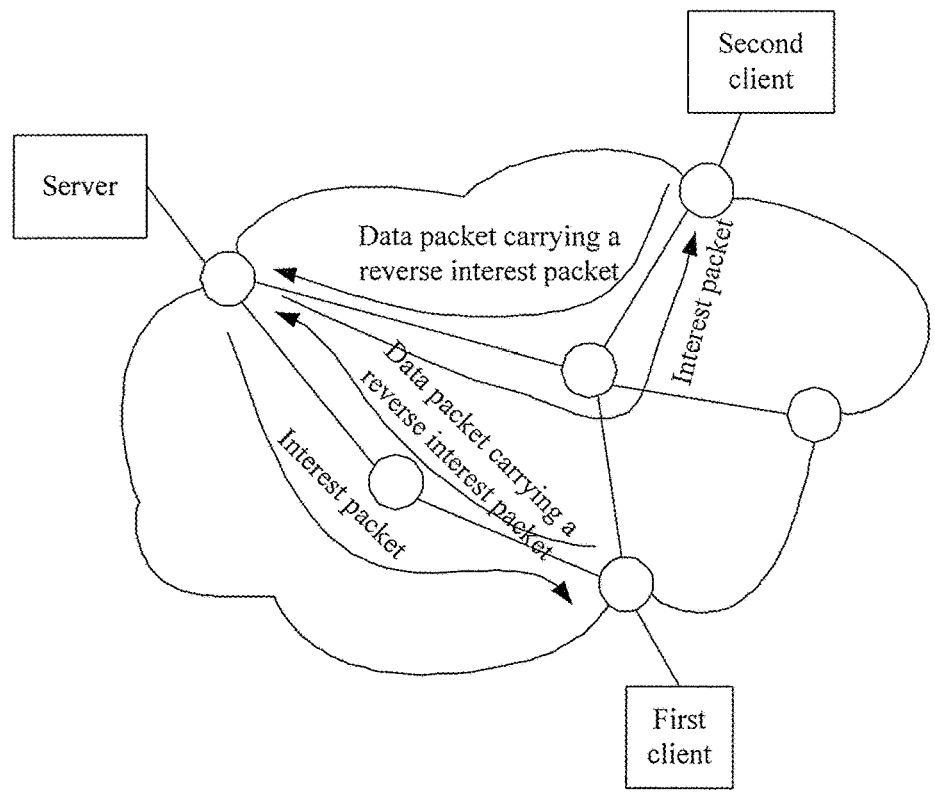
FIG. 10 is a schematic diagram of an application scenario in which a server executes a session with multiple clients according to an embodiment of the present invention.

FIG. 10 is a schematic diagram of an application scenario in which a server establishes a session with multiple clients according to an embodiment of the present invention. As shown in FIG. 10, the server establishes a session with a first client and a second client at the same time through an NDN. A service provided by the server commonly exists in an FIB of a routing device in a network after the server registers a content name with the network and spreads routing information. Therefore, the clients may easily communicate with the server by sending an interest packet. Because the clients temporarily initiate a session in most cases, spreading of content names and routing information that correspond to the clients in the entire network causes a relatively large delay, which causes relatively great impact on successful sending of an interest packet of the server to the clients. However, in this embodiment, the server carries, in a data packet returned to the client, an interest packet which is going to be sent to a client, so that the interest packet can efficiently reach the client through a reverse path (namely, a PIT corresponding to the interest packet corresponding to the data packet that is returned by the server to the client) formed in a PIT in the network, and so on.

In this scenario, according to the method provided in this embodiment of the present invention, for a one-to-multiple service-type session application (for example, electronic transaction session processing) in a network, only a server side needs to spread a content name corresponding to a service of the server side to the entire network for routing, and a client does not need to spread routing information of the client in the entire network. An interest packet sent by the server side to the client can reach the client by being carried in a data packet, thereby greatly improving routing efficiency, and reducing a size of an FIB of a routing device in the network and a routing overhead.

Figure 11:
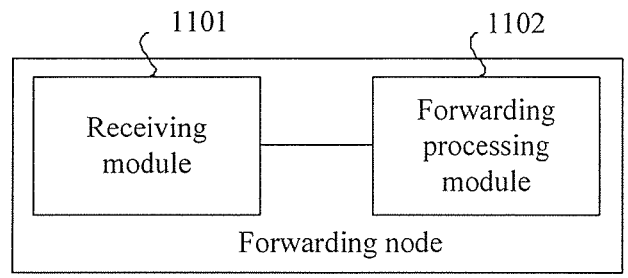
FIG. 11 is a schematic structural diagram of a routing device according to an embodiment of the present invention.

FIG. 11 is a schematic structural diagram of a forwarding node according to an embodiment of the present invention. The forwarding node includes a PIT, where the PIT includes one or more PIT entries, and each PIT entry includes a content name and a port. As shown in FIG. 11, the forwarding node further includes: a receiving module 1101 and a forwarding processing module 1102.

The receiving module 1101 is configured to receive a data packet, where the data packet is generated and sent by a destination device after the destination device receives a first interest packet that is sent by a source device and is forwarded via the forwarding node, where the first interest packet is used by the source device to request content from the destination device, the data packet carries a content name that is the same as a content name of the content requested by using the first interest packet, and when forwarding the first interest packet, the forwarding node matches the PIT according to the first interest packet, so that the PIT includes a PIT entry corresponding to the first interest packet.

The forwarding processing module 1102 is connected to the receiving module 1101 and is configured to: when determining that the data packet received by the receiving module 1101 carries a second interest packet, match the content name carried in the data packet with a content name in the PIT entry, and forward the data packet to the source device according to a port in the matched PIT entry, where the second interest packet is used by the destination device to request content from the source device.

Further, the forwarding processing module 1102 may be further configured to: when determining that the data packet does not carry the second interest packet, match the content name carried in the data packet with the content name in the PIT entry, and forward the data packet to the source device according to the port in the matched PIT entry.

Figure 12:
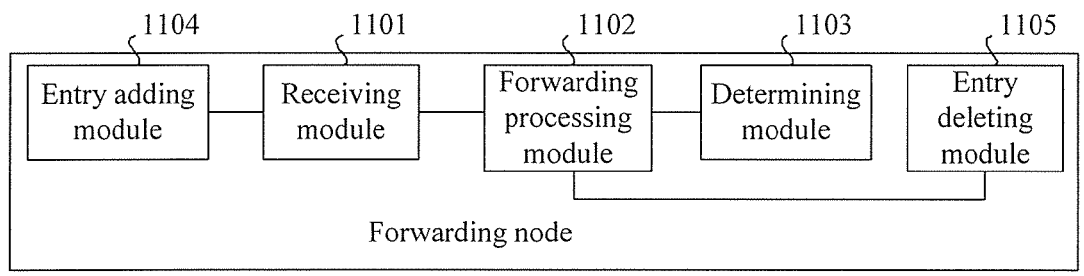
FIG. 12 is a schematic structural diagram of another routing device according to an embodiment of the present invention.

In one optional implementation manner, as shown in FIG. 12, the forwarding node further includes: a determining module 1103.

The determining module 1103 is configured to query a local CS according to a content name in the second interest packet, and determine whether content corresponding to the content name in the second interest packet exists in the local CS.

Based on the determining module 1103, the forwarding processing module 1102 is further connected to the determining module 1103 and is specifically configured to: if the determining module 1103 determines that the content corresponding to the content name in the second interest packet does not exist in the local CS, when determining that the data packet carries the second interest packet, match the content name carried in the data packet with the content name in the PIT entry, and forward the data packet to the source device according to the port in the matched PIT entry.

Further, the forwarding processing module 1102 is further configured to: before matching the content name carried in the data packet with the content name in the PIT entry, and forwarding the data packet to the source device according to the port in the matched PIT entry, if the determining module 1103 determines that the content corresponding to the content name in the second interest packet exists in the local CS, send, through a port through which the data packet is received, the content that is in the local CS and corresponds to the content name in the second interest packet.

Optionally, the forwarding processing module 1102 may be specifically configured to: if the determining module 1103 determines that the content corresponding to the content name in the second interest packet exists in the local CS, send, through the port through which the data packet is received, the content that is in the local CS and corresponds to the content name in the second interest packet, delete the second interest packet from the data packet, match the content name carried in the data packet with the content name in the PIT entry, and forward, to the source device according to the port in the matched PIT entry, the data packet from which the second interest packet is deleted.

Further, as shown in FIG. 12, the forwarding node further includes: an entry adding module 1104. The entry adding module 1104 is connected to the receiving module 1101 and is configured to: after the receiving module 1101 receives the data packet and it is determined that the data packet carries the second interest packet, generate or update a PIT entry corresponding to the second interest packet.

The entry adding module 1104 may be specifically configured to query the PIT according to the content name in the second interest packet; and if a PIT entry which includes the content name in the second interest packet exists in the PIT, in the PIT entry which includes the content name in the second interest packet, add information about the port through which the data packet is received, so as to update the PIT entry corresponding to the second interest packet; or if a PIT entry which includes the content name in the second interest packet does not exist in the PIT, add, to the PIT, a PIT entry which includes the content name in the second interest packet and information about the port through which the data packet is received, so as to generate the PIT entry corresponding to the second interest packet.

Further, as shown in FIG. 12, the forwarding node further includes: an entry deleting module 1105. The entry deleting module 1105 is connected to the forwarding processing module 1102 and is configured to: after the forwarding processing module 1102 forwards the data packet to the source device according to the port in the matched PIT entry, remove the matched PIT entry from the PIT.

The data packet received by the receiving module 1101 may carry one or more second interest packets.

In one optional implementation manner, the data packet received by the receiving module 1101 further carries a piggyback interest identifier that is used to identify whether the data packet carries the second interest packet. Based on this, the forwarding processing module 1102 may be specifically configured to: when determining, by determining a value of the piggyback interest identifier, that the data packet carries the second interest packet, match the content name carried in the data packet with the content name in the PIT entry, and forward the data packet to the source device according to the port in the matched PIT entry.

Optionally, a manner of carrying the piggyback interest identifier in the data packet received by the receiving module 1101 includes:

carrying the piggyback interest identifier in a digital signature information field of the data packet; or adding a first field to the data packet, and carrying the piggyback interest identifier in the first field.

Optionally, a manner of carrying the second interest packet in the data packet received by the receiving module 1101 includes:

adding a second field in front of a data payload field to the data packet, and carrying the second interest packet in the second field; or adding a third field behind a data payload field to the data packet, and carrying the second interest packet in the third field.

In one optional implementation manner, multiple other forwarding nodes further exist between the forwarding node provided in this embodiment and the source device. Based on this, the forwarding processing module 1102 may be specifically configured to: when the multiple other forwarding nodes exist between the forwarding node and the source device, if determining that the data packet carries the second interest packet, match the content name carried in the data packet with the content name in the PIT entry, and forward the data packet to a next forwarding node according to the port in the matched PIT entry, so that after receiving the data packet and when determining that the data packet carries the second interest packet, the next forwarding node matches the content name carried in the data packet with the content name in the PIT entry, and then forwards the data packet to a next forwarding node according to a port in the matched PIT entry, and so on, so as to forward the data packet to the source device.

The forwarding node provided in this embodiment may be but is not limited to a router or a routing node in an NDN.

Functional modules of the forwarding node provided in this embodiment may be configured to execute processes of the method embodiments shown in FIG. 1, FIG. 4, and FIG. 5. Specific working principles of the functional modules are not described herein again. For details, refer to the descriptions of the method embodiments.

When forwarding a first interest packet of a source device to a destination device, the forwarding node provided in this embodiment matches a PIT according to the first interest packet, so that the PIT includes a PIT entry corresponding to the first interest packet, which provides a reverse path for a data packet returned by the destination device in response to the first interest packet. After receiving the data packet sent by the destination device, the forwarding node can send, to a destination by using the reverse path that is corresponding to the data packet and is stored in the PIT, the data packet and a reverse interest packet carried in the data packet. In this way, an FIB is not queried hop by hop any longer for routing an interest packet, thereby improving efficiency of routing the interest packet.

Figure 13:
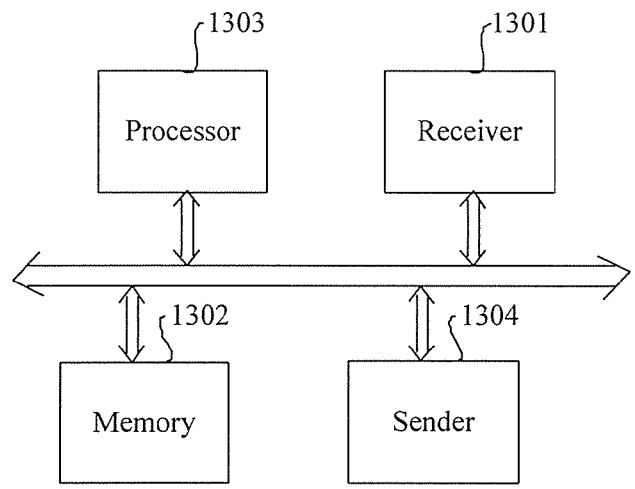
FIG. 13 is a schematic structural diagram of still another routing device according to an embodiment of the present invention.

FIG. 13 is a schematic structural diagram of still another forwarding node according to an embodiment of the present invention. The forwarding node includes a PIT, where the PIT includes one or more PIT entries, and each PIT entry includes a content name and a port. As shown in FIG. 13, the forwarding node further includes: a receiver 1301, a memory 1302, a processor 1303, and a sender 1304.

The receiver 1301 is configured to receive a data packet, where the data packet is generated and sent by a destination device after the destination device receives a first interest packet that is sent by a source device and is forwarded via the forwarding node, where the first interest packet is used by the source device to request content from the destination device, the data packet carries a content name that is the same as a content name of the content requested by using the first interest packet, and when forwarding the first interest packet, the forwarding node matches the first interest packet with the pending information table, so that the pending information table includes a PIT entry corresponding to the first interest packet.

The memory 1302 is configured to store a program. Specifically, the program may include program code, where the program code includes a computer operation instruction.

The memory 1302 may include a high-speed RAM memory, or may include a non-volatile memory (non-volatile memory), for example, at least one disk memory.

The processor 1303 is configured to execute the program stored in the memory 1302, so as to: determine whether the data packet received by the receiver 1301 carries a second interest packet; and when determining that the data packet carries the second interest packet, match the content name carried in the data packet with a content name in the PIT entry, and provide a matched PIT entry for the sender 1304. The second interest packet is used by the destination device to request content from the source device.

The processor 1303 may be a central processing unit (Central Processing Unit, CPU for short), or an application specific integrated circuit (Application Specific Integrated Circuit, ASIC for short), or may be configured as one or more integrated circuits for implementing this embodiment of the present invention.

The sender 1304 is configured to forward the data packet to the source device according to a port in the matched PIT entry provided by the processor 1303.

In one optional implementation manner, the processor 1303 is further configured to: when determining that the data packet does not carry the second interest packet, match the content name carried in the data packet with the content name in the PIT entry, and provide the matched PIT entry for the sender 1304. Based on this, the sender 1304 is further configured to: when the data packet does not carry the second interest packet, forward, under control of the processor 1303, the data packet to the source device according to the port in the matched PIT entry.

In one optional implementation manner, the processor 1303 is further configured to query a local storage table CS according to a content name in the second interest packet, and determine whether content corresponding to the content name in the second interest packet exists in the local CS. Based on this, the processor 1303 may be specifically configured to: if determining that the content corresponding to the content name in the second interest packet does not exist in the local CS, when determining that the data packet carries the second interest packet, match the content name carried in the data packet with the content name in the PIT entry, and forward the data packet to the source device according to the port in the matched PIT entry.

Further optionally, the sender 1304 is further configured to: before forwarding the data packet to the source device according to the port in the matched PIT entry provided by the processor 1303, if the processor 1303 determines that the content corresponding to the content name in the second interest packet exists in the local CS, send, through a port through which the data packet is received, the content that is in the local CS and corresponds to the content name in the second interest packet.

Further, the processor 1303 may be specifically configured to: if determining that the content corresponding to the content name in the second interest packet exists in the local CS, control the sender 1304 to send, through the port through which the data packet is received, the content that is in the local CS and corresponds to the content name in the second interest packet, delete the second interest packet from the data packet, and control the sender 1304 to forward, to the source device according to the port in the matched PIT entry, the data packet from which the second interest packet is deleted.

Correspondingly, the sender 1304 is further configured to: when the processor 1303 determines that the content corresponding to the content name in the second interest packet exists in the local CS, send, under control of the processor 1303 and through the port through which the data packet is received, the content that is in the local CS and corresponds to the content name in the second interest packet, and forward, to the source device according to the port in the matched PIT entry, the data packet from which the second interest packet is deleted.

In one optional implementation manner, the processor 1303 may be further configured to: after the receiver 1301 receives the data packet and it is determined that the data packet carries the second interest packet, generate or update a PIT entry corresponding to the second interest packet.

The processor 1303 is specifically configured to query the PIT according to the content name in the second interest packet; and if a PIT entry which includes the content name in the second interest packet exists in the PIT, add, to the PIT entry which includes the content name in the second interest packet, information about the port through which the data packet is received, so as to update the PIT entry corresponding to the second interest packet; or if a PIT entry which includes the content name in the second interest packet does not exist in the PIT, add, to the PIT, a PIT entry which includes the content name in the second interest packet and information about the port through which the data packet is received, so as to generate the PIT entry corresponding to the second interest packet.

In one optional implementation manner, the processor 1303 may be further configured to: after the sender 1304 forwards the data packet to the source device according to the port in the matched PIT entry, remove the matched PIT entry from the pending information table.

Optionally, the data packet received by the receiver 1301 may carry one or more second interest packets.

In one optional implementation manner, the data packet further carries a piggyback interest identifier that is used to identify whether the data packet carries the second interest packet. Based on this, the processor 1303 may be specifically configured to: when determining, by determining a value of the piggyback interest identifier, that the data packet carries the second interest packet, match the content name carried in the data packet with the content name in the PIT entry, and provide the matched PIT entry for the sender 1304.

Optionally, a manner of carrying the piggyback interest identifier in the data packet received by the receiver 1301 includes:

carrying the piggyback interest identifier in a digital signature information field of the data packet; or adding a first field to the data packet, and carrying the piggyback interest identifier in the first field.

Optionally, a manner of carrying the second interest packet in the data packet received by the receiver 1301 includes:

adding a second field in front of a data payload field to the data packet, and carrying the second interest packet in the second field; or adding a third field behind a data payload field to the data packet, and carrying the second interest packet in the third field.

In one optional implementation manner, multiple other forwarding nodes exist between the forwarding node provided in this embodiment and the source device. In this case, the processor 1303 may be specifically configured to: when the multiple other forwarding nodes exist between the forwarding node and the source device, if determining that the data packet carries the second interest packet, match the content name carried in the data packet with the content name in the PIT entry, and provide the matched PIT table entry for the sender 1304 to enable the sender 1304 to forward the data packet to a next forwarding node according to the port in the matched PIT entry, so that after receiving the data packet and when determining that the data packet carries the second interest packet, the next forwarding node matches the content name carried in the data packet with the content name in the PIT entry, and then forwards the data packet to a next forwarding node according to a port in the matched PIT entry, and so on, so as to forward the data packet to the source device.

Optionally, in specific implementation, if the receiver 1301, the memory 1302, the processor 1303, and the sender 1304 are independently implemented, the receiver 1301, the memory 1302, the processor 1303, and the sender 1304 may be mutually connected and communicate with each other by using a bus. The bus may be an Industry Standard Architecture (Industry Standard Architecture, ISA for short) bus, a Peripheral Component Interconnect (Peripheral Component, PCI for short) bus, an Extended Industry Standard Architecture (Extended Industry Standard Architecture, EISA for short) bus, or the like. The bus may be classified into an address bus, a data bus, a control bus, and the like. For ease of description, the bus is represented by using only one bold line in FIG. 13, which, however, does not mean that there is only one bus or a type of bus.

Optionally, in specific implementation, if the receiver 1301, the memory 1302, the processor 1303, and the sender 1304 are integrated on one chip for implementation, the receiver 1301, the memory 1302, the processor 1303, and the sender 1304 may communicate with each other by using an internal interface.

The forwarding node provided in this embodiment may be but is not limited to a router or a routing node in an NDN.

The forwarding node provided in this embodiment may be configured to execute processes of the method embodiments shown in FIG. 1, FIG. 4, and FIG. 5. A specific working principle of the forwarding node is not described herein again. For details, reference may be made to the descriptions of the method embodiments.

When forwarding a first interest packet of a source device to a destination device, the forwarding node provided in this embodiment matches a PIT according to the first interest packet, so that the PIT includes a PIT entry corresponding to the first interest packet, which provides a reverse path for a data packet returned by the destination device for the first interest packet. After receiving the data packet sent by the destination device, the forwarding node can send, to a destination by using the reverse path that is corresponding to the data packet and is stored in the PIT, the data packet and a reverse interest packet carried in the data packet. In this way, a query of an FIB is not performed hop by hop any longer for routing an interest packet, thereby improving efficiency of routing the interest packet.

Figure 14:
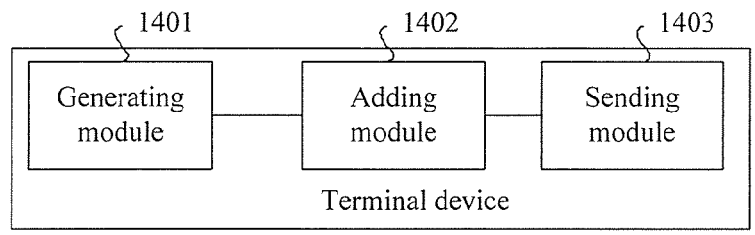
FIG. 14 is a schematic structural diagram of a terminal device according to an embodiment of the present invention.

FIG. 14 is a schematic structural diagram of a terminal device according to an embodiment of the present invention. As shown in FIG. 14, the terminal device includes: a generating module 1401, an adding module 1402, and a sending module 1403.

The generating module 1401 is configured to generate a data packet according to a received first interest packet. The first interest packet is forwarded by a source device via a forwarding node and is used by the source device to request content from the terminal device, where the forwarding node includes a PIT, the PIT includes one or more PIT entries, and each PIT entry includes a content name and a port; and when forwarding the first interest packet, the forwarding node matches the first interest packet with the pending information table, so that the pending information table includes a PIT entry corresponding to the first interest packet.

The adding module 1402 is connected to the generating module 1402 and is configured to: when it is determined that a second interest packet which is going to be sent to the source device needs to be carried in the data packet generated by the generating module 1401, carry the second interest packet in the data packet, where the second interest packet is used by the terminal device to request content from the source device.

The sending module 1403 is connected to the adding module 1402 and is configured to send the data packet to the forwarding node, so that when determining that the data packet carries the second interest packet, the forwarding node matches a content name carried in the data packet with a content name in the PIT entry, and forwards the data packet to the source device according to a port in the matched PIT entry.

In one optional implementation manner, the adding module 1402 is further configured to: when it is determined that the second interest packet which is going to be sent to the source device needs to be carried in the data packet, carry a piggyback interest identifier in the data packet, and set a value of the piggyback interest identifier to a value used to identify that the data packet carries the second interest packet, where the piggyback interest identifier is used to identify whether the data packet carries the second interest packet.

Optionally, the data packet may carry one or more second interest packets.

Optionally, that the adding module 1402 is configured to carry the piggyback interest identifier in the data packet includes:

the adding module 1402 may be specifically configured to carry the piggyback interest identifier in a digital signature information field of the data packet; or the adding module 1402 may be specifically configured to add a first field to the data packet, and carry the piggyback interest identifier in the first field.

Optionally, that the adding module 1402 is configured to carry the second interest packet in the data packet includes:

the adding module 1402 may be specifically configured to add a second field in front of a data payload field to the data packet, and carry the second interest packet in the second field; or the adding module 1402 may be specifically configured to add a third field behind a data payload field to the data packet, and carry the second interest packet in the third field.

The terminal device provided in this embodiment may be used as the destination device in the foregoing embodiments, or may be a terminal device in an NDN.

Functional modules of the terminal device provided in this embodiment may be configured to execute processes of the method embodiments shown in FIG. 6 and FIG. 7. Specific working principles of the functional modules are not described herein again. For details, refer to the descriptions of the method embodiments.

When returning a data packet to a source device according to a first interest packet sent by the source device, the terminal device provided in this embodiment carries a second interest packet which is going to be sent to the source device in the data packet, so that a forwarding node in a network can forward, based on a port in a PIT entry that is in a PIT and matches a content name carried in the data packet, both the data packet and the second interest packet to the source device, thereby providing a prerequisite for improving efficiency of successfully sending an interest packet in an information centric network, decreasing a processing overhead of the forwarding node, and reducing a data exchange delay.

Figure 15:
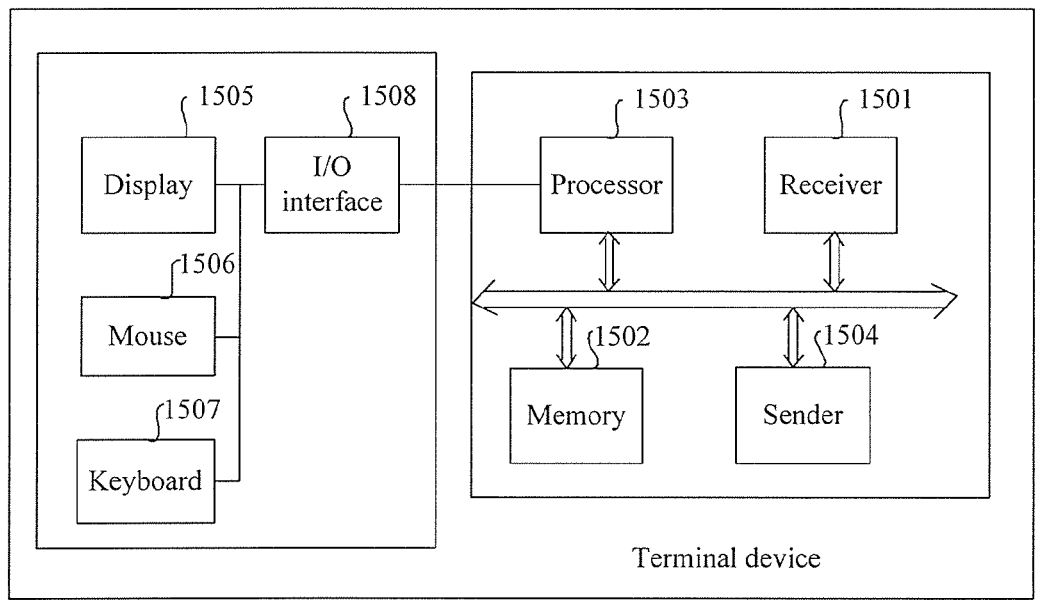
FIG. 15 is a schematic structural diagram of another terminal device according to an embodiment of the present invention.

FIG. 15 is a schematic structural diagram of another terminal device according to an embodiment of the present invention. As shown in FIG. 15, the terminal device includes: a receiver 1501, a memory 1502, a processor 1503, and a sender 1504.

The receiver 1501 is configured to receive a first interest packet. The first interest packet is forwarded by a source device via a forwarding node and is used by the source device to request content from the terminal device, where the forwarding node includes a PIT, the PIT includes one or more PIT entries, and each PIT entry includes a content name and a port; and when forwarding the first interest packet, the forwarding node matches the first interest packet with the pending information table, so that the pending information table includes a PIT entry corresponding to the first interest packet.

The memory 1502 is configured to store a program. Specifically, the program may include program code, where the program code includes a computer operation instruction.

The memory 1502 may include a high-speed RAM memory, or may include a non-volatile memory (non-volatile memory), for example, at least one disk memory.

The processor 1503 is configured to execute the program stored in the memory 1502, so as to: generate a data packet according to the first interest packet received by the receiver 1501, and when determining that a second interest packet which is going to be sent to the source device needs to be carried in the data packet, carry the second interest packet in the data packet, where the second interest packet is used by the terminal device to request content from the source device.

The processor 1503 may be a CPU, or a specific ASIC, or may be configured as one or more integrated circuits for implementing this embodiment of the present invention.

The sender 1504 is configured to send the data packet to the forwarding node, so that when determining that the data packet carries the second interest packet, the forwarding node matches a content name carried in the data packet with a content name in the PIT entry, and forwards the data packet to the source device according to a port in the matched PIT entry.

In one optional implementation manner, the processor 1503 is further configured to: when determining that the second interest packet which is going to be sent to the source device needs to be carried in the data packet, carry a piggyback interest identifier in the data packet, and set a value of the piggyback interest identifier to a value used to identify that the data packet carries the second interest packet, where the piggyback interest identifier is used to identify whether the data packet carries the second interest packet.

Optionally, the data packet may carry one or more second interest packets.

Optionally, that the processor 1503 is configured to carry the piggyback interest identifier in the data packet includes:

the processor 1503 may be specifically configured to carry the piggyback interest identifier in a digital signature information field of the data packet; or the processor 1503 may be specifically configured to add a first field to the data packet, and carry the piggyback interest identifier in the first field.

Optionally, that the processor 1503 is configured to carry the second interest packet in the data packet includes:

the processor 1503 may be specifically configured to add a second field before a data payload field to the data packet, and carry the second interest packet in the second field; or the processor 1503 may be specifically configured to add a third field after a data payload field to the data packet, and carry the second interest packet in the third field.

Optionally, in specific implementation, if the receiver 1501, the memory 1502, the processor 1503, and the sender 1504 are independently implemented, the receiver 1501, the memory 1502, the processor 1503, and the sender 1504 may be mutually connected and communicate with each other by using a bus. The bus may be an ISA bus, a PCI bus, an EISA bus, or the like. The bus may be classified into an address bus, a data bus, a control bus, and the like. For ease of description, the bus is represented by using only one bold line in FIG. 15, which, however, does not mean that there is only one bus or a type of bus.

Optionally, in specific implementation, if the receiver 1501, the memory 1502, the processor 1503, and the sender 1504 are integrated on one chip for implementation, the receiver 1501, the memory 1502, the processor 1503, and the sender 1504 may communicate with each other by using an internal interface.

Optionally, as shown in FIG. 15, in addition to including the receiver 1501, the memory 1502, the processor 1503, and the sender 1504, the terminal device provided in this embodiment may further include peripheral devices such as a display 1505, a mouse 1506, and a keyboard 1507. The peripheral devices such as the display 1505, the mouse 1506, and the keyboard 1507 are connected to the processor 1503 by using an input/output (Input/Output, I/O for short) interface 1508.

The terminal device provided in this embodiment may be used as the destination device in the foregoing embodiments, or may be a terminal device in an NDN.

The terminal device provided in this embodiment may be configured to execute processes of the method embodiments shown in FIG. 6 and FIG. 7. A specific working principle of the terminal device is not described herein again. For details, refer to the descriptions of the method embodiments.

When returning a data packet to a source device according to a first interest packet sent by the source device, the terminal device provided in this embodiment carries a second interest packet which is going to be sent to the source device in the data packet, so that a forwarding node in a network can forward, based on a port in a PIT entry that is in a PIT and matches a content name carried in the data packet, both the data packet and the second interest packet to the source device, thereby providing a prerequisite for improving efficiency of successfully sending an interest packet in an information centric network, decreasing a processing overhead of the forwarding node, and reducing a data exchange delay.

Figure 16:
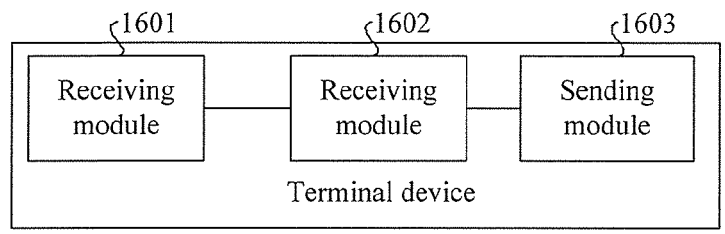
FIG. 16 is a schematic structural diagram of still another terminal device according to an embodiment of the present invention.

FIG. 16 is a schematic structural diagram of still another terminal device according to an embodiment of the present invention. As shown in FIG. 16, the terminal device includes: a receiving module 1601, a generating module 1602, and a sending module 1603.

The receiving module 1601 is configured to receive a first data packet. The first data packet is generated by a destination device according to a first interest packet of the terminal device and is forwarded via a forwarding node, where the first interest packet is used by the terminal device to request content from the destination device; the forwarding node includes a PIT, the PIT includes one or more PIT entries, and each PIT entry includes a content name and a port; and after receiving the first data packet and determining that the first data packet carries a second interest packet, the forwarding node generates or updates a PIT entry corresponding to the second interest packet, where the second interest packet is used by the destination device to request content from the terminal device.

The generating module 1602 is connected to the receiving module 1601 and is configured to: when it is determined that the first data packet carries the second interest packet, acquire the second interest packet from the first data packet, and generate a second data packet according to the second interest packet, where the second data packet carries a content name that is the same as a content name of the content requested by using the second interest packet.

The sending module 1603 is connected to the generating module 1602 and is configured to send the second data packet to the forwarding node, so that the forwarding node matches the content name carried in the second data packet with a content name in the PIT entry, and forwards the second data packet to the destination device according to a port in the matched PIT entry.

Figure 17:
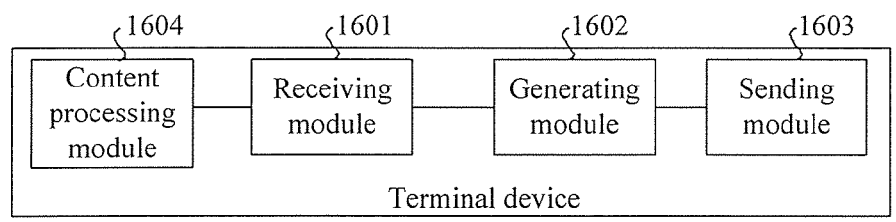
FIG. 17 is a schematic structural diagram of still another terminal device according to an embodiment of the present invention.

In one optional implementation manner, as shown in FIG. 17, the terminal device further includes: a content processing module 1604.

The content processing module 1604 is connected to the receiving module 1601 and is configured to acquire, from the first data packet received by the receiving module 1601, the content requested by using the first interest packet, and process the content.

In one optional implementation manner, the first data packet further carries a piggyback interest identifier that is used to identify whether the first data packet carries the second interest packet. Based on this, the generating module 1602 is specifically configured to: when it is determined, by determining a value of the piggyback interest identifier, that the first data packet carries the second interest packet, acquire the second interest packet from the first data packet, and generate the second data packet according to the second interest packet.

Optionally, the first data packet may carry one or more interest packets.

The terminal device provided in this embodiment may be used as the source device in the foregoing embodiments, or may be a terminal device in an NDN.

Functional modules of the terminal device provided in this embodiment may be configured to execute a process of the method embodiment shown in FIG. 8. Specific working principles of the functional modules are not described herein again. For details, refer to the description of the method embodiment.

The terminal device provided in this embodiment performs determining on a first data packet that is returned by a destination device according to a first interest packet of a source device; and when determining that the first data packet carries a second interest packet, acquires the carried second interest packet from the first data packet, and performs processing according to the acquired second interest packet, thereby providing support for improving efficiency of successfully sending an interest packet in an information centric network, decreasing a processing overhead of a forwarding node, reducing a data exchange delay, and the like.

Figure 18:
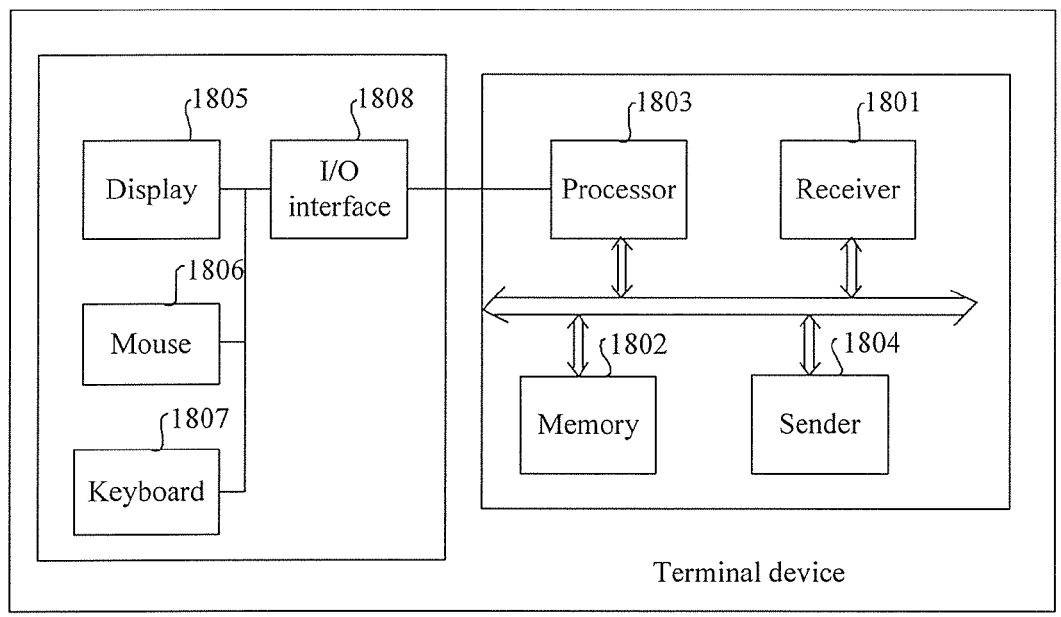
FIG. 18 is a schematic structural diagram of still another terminal device according to an embodiment of the present invention.

FIG. 18 is a schematic structural diagram of still another terminal device according to an embodiment of the present invention. As shown in FIG. 18, the terminal device includes: a receiver 1801, a memory 1802, a processor 1803, and a sender 1804.

The receiver 1801 is configured to receive a first data packet. The first data packet is generated by a destination device according to a first interest packet of the terminal device and is forwarded via a forwarding node, where the first interest packet is used by the terminal device to request content from the destination device; the forwarding node includes a PIT, the PIT includes one or more PIT entries, and each PIT entry includes a content name and a port; and after receiving the first data packet and determining that the first data packet carries a second interest packet, the forwarding node generates or updates a PIT entry corresponding to the second interest packet, where the second interest packet is used by the destination device to request content from the terminal device.

The memory 1802 is configured to store a program. Specifically, the program may include program code, where the program code includes a computer operation instruction.

The memory 1802 may include a high-speed RAM memory, or may include a non-volatile memory (non-volatile memory), for example, at least one disk memory.

The processor 1803 is configured to execute the program stored in the memory 1802, so as to: when determining that the first data packet carries the second interest packet, acquire the second interest packet from the first data packet, and generate a second data packet according to the second interest packet, where the second data packet carries a content name that is the same as a content name of the content requested by using the second interest packet.

The processor 1803 may be a CPU, or a specific ASIC, or may be configured as one or more integrated circuits for implementing this embodiment of the present invention.

The sender 1804 is configured to send the second data packet to the forwarding node, so that the forwarding node matches the content name carried in the second data packet with a content name in the PIT entry, and forwards the second data packet to the destination device according to a port in the matched PIT entry.

In one optional implementation manner, the first data packet further carries a piggyback interest identifier that is used to identify whether the first data packet carries the second interest packet. Based on this, the processor 1803 may be specifically configured to: when determining, by determining a value of the piggyback interest identifier, that the first data packet carries the second interest packet, acquire the second interest packet from the first data packet, and generate the second data packet according to the second interest packet.

In one optional implementation manner, the processor 1803 is further configured to acquire, from the first data packet, the content requested by using the first interest packet, and process the content.

Optionally, the first data packet may carry one or more interest packets.

Optionally, in specific implementation, if the receiver 1801, the memory 1802, the processor 1803, and the sender 1804 are independently implemented, the receiver 1801, the memory 1802, the processor 1803, and the sender 1804 may be mutually connected and communicate with each other by using a bus. The bus may be an ISA bus, a PCI bus, an EISA bus, or the like. The bus may be classified into an address bus, a data bus, a control bus, and the like. For ease of description, the bus is represented by using only one bold line in FIG. 18, which, however, does not mean that there is only one bus or a type of bus.

Optionally, in specific implementation, if the receiver 1801, the memory 1802, the processor 1803, and the sender 1804 are integrated on one chip for implementation, the receiver 1801, the memory 1802, the processor 1803, and the sender 1804 may communicate with each other by using an internal interface.

Optionally, as shown in FIG. 18, in addition to including the receiver 1801, the memory 1802, the processor 1803, and the sender 1804, the terminal device provided in this embodiment may further include peripheral devices such as a display 1805, a mouse 1806, and a keyboard 1807. The peripheral devices such as the display 1805, the mouse 1806, and the keyboard 1807 are connected to the processor 1803 by using an I/O interface 1808.

The terminal device provided in this embodiment may be used as the source device in the foregoing embodiments, or may be a terminal device in an NDN.

Functional modules of the terminal device provided in this embodiment may be configured to execute a process of the method embodiment shown in FIG. 8. Specific working principles of the functional modules are not described herein again. For details, refer to the description of the method embodiment.

The terminal device provided in this embodiment performs determining on a first data packet that is returned by a destination device according to a first interest packet of a source device; and when determining that the first data packet carries a second interest packet, acquires the carried second interest packet from the first data packet, and performs processing according to the acquired second interest packet, thereby providing support for improving efficiency of successfully sending an interest packet in an information centric network, decreasing a processing overhead of a forwarding node, reducing a data exchange delay, and the like.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A packet processing method for use by a forwarding node in an information centric network (ICN), wherein the forwarding node comprises a pending information table (PIT) comprising one or more PIT entries, and each PIT entry comprises a content name and a port, the method comprising:

receiving, by the forwarding node, a data packet generated and sent by a destination device after the destination device receives a first interest packet sent by a source device and is forwarded via the forwarding node, wherein the first interest packet is used by the source device to request content from the destination device, the data packet carries a content name that is the same as a content name of the content requested by using the first interest packet, and when forwarding the first interest packet, the forwarding node matches the first interest packet with the pending information table, so that the pending information table comprises a PIT entry corresponding to the first interest packet; and when determining that the data packet carries a second interest packet, matching the content name carried in the data packet with the content name in the PIT entry, and forwarding the data packet to the source device according to the port in the matched PIT entry, wherein the second interest packet is used by the destination device to request content from the source device, and wherein the data packet carries a piggyback interest identifier that is used to identify whether the data packet carries the second interest packet.

2. The method according to claim 1, wherein when determining that the data packet carries the second interest packet and before matching the content name carried in the data packet with the content name in the PIT entry, and forwarding the data packet to the source device according to the port in the matched PIT entry, the method further comprises:

querying a local storage table according to a content name in the second interest packet, and determining that content corresponding to the content name in the second interest packet does not exist in the local storage table.

3. The method according to claim 2, wherein before matching the content name carried in the data packet with the content name in the PIT entry, and forwarding the data packet to the source device according to the port in the matched PIT entry, the method further comprises:
if determining that the content corresponding to the content name in the second interest packet exists in the local storage table, sending, through a port through which the data packet is received, the content that is in the local storage table and corresponds to the content name in the second interest packet.

4. The method according to claim 3, wherein sending, through the port through which the data packet is received, the content that is in the local storage table and corresponds to the content name in the second interest packet, and the matching the content name carried in the data packet with DA the content name in the PIT entry, and forwarding the data packet to the source device according to the port in the matched PIT entry comprise:
sending, through the port through which the data packet is received, the content that is in the local storage table and corresponds to the content name in the second interest packet, deleting the second interest packet from the data packet, matching the content name carried in the data packet with the content name in the PIT entry, and forwarding, to the source device according to the port in the matched PIT entry, the data packet from which the second interest packet is deleted.

5. The method according to claim 1, further comprising:
after receiving the data packet and determining that the data packet carries the second interest packet, generating or updating a PIT entry corresponding to the second interest packet.

6. The method according to claim 5, wherein generating or updating the PIT entry corresponding to the second interest packet comprises:
querying the pending information table according to the content name in the second interest packet; and
if a PIT entry which comprises the content name in the second interest packet exists in the pending information table, adding, to the PIT entry which comprises the content name in the second interest packet, information about the port through which the data packet is received, so as to update the PIT entry corresponding to the second interest packet; or
if the PIT entry which comprises the content name in the second interest packet does not exist in the pending information table, adding, to the pending information table, the PIT entry which comprises the content name in the second interest packet and information about the port through which the data packet is received, so as to generate the PIT entry corresponding to the second interest packet.

7. The method according to claim 1, further comprising:
when determining that the data packet does not carry the second interest packet, matching the content name carried in the data packet with the content name in the PIT entry, and forwarding the data packet to the source device according to the port in the matched PIT entry.

8. The method according to claim 1, further comprising:
after forwarding the data packet to the source device according to the port in the matched PIT entry, removing the matched PIT entry from the pending information table.

9. The method according to claim 1, wherein the second interest packet comprises one or more second interest packets.

10. The method according to claim 1, wherein:
determining that the data packet carries the second interest packet is performed by determining a value of the piggyback interest identifier.

11. The method according to claim 1, wherein a manner of carrying the piggyback interest identifier in the data packet comprises:
carrying the piggyback interest identifier in a digital signature information field of the data packet; or
adding a first field to the data packet, and carrying the piggyback interest identifier in the first field.

12. The method according to claim 1, wherein a manner of carrying the second interest packet in the data packet comprises:
adding a second field in front of a data payload field to the data packet, and carrying the second interest packet in the second field; or
adding a third field behind the data payload field to the data packet, and carrying the second interest packet in the third field.

13. The method according to claim 1, wherein when multiple other forwarding nodes exist between the forwarding node and the source device, the forwarding the data packet to the source device according to the port in the matched PIT entry comprises:
forwarding the data packet to a next forwarding node according to the port in the matched PIT entry, so that after receiving the data packet and when determining that the data packet carries the second interest packet, the next forwarding node matches the content name carried in the data packet with the content name in the PIT entry, and then forwards the data packet to the next forwarding node according to the port in the matched PIT entry, and so on, so as to forward the data packet to the source device.

14. A packet processing method, comprising:
generating, by a destination device, a data packet according to a received first interest packet, wherein the first interest packet is forwarded by a source device via a forwarding node and is used by the source device to request content from the destination device, wherein the forwarding node comprises a pending information table (PIT), the PIT comprises one or more PIT entries, and each PIT entry comprises a content name and a port, and when forwarding the first interest packet, the forwarding node matches the first interest packet with the pending information table, so that the pending information table comprises a PIT entry corresponding to the first interest packet;
when determining that a second interest packet which is going to be sent to the source device needs to be carried in the data packet, carrying, by the destination device, the second interest packet and a piggyback interest identifier in the data packet, wherein the second interest packet is used by the destination device to request content from the source device and the piggyback interest identifier is used to identify whether the data packet carries the second interest packet; and
sending, by the destination device, the data packet to the forwarding node, so that when determining that the data packet carries the second interest packet, the forwarding node matches a content name carried in the data packet with the content name in the PIT entry, and forwards the data packet to the source device according to the port in the matched PIT entry.

15. The method according to claim 14, further comprising:
setting a value of the piggyback interest identifier to a value used to identify that the data packet carries the second interest packet.

16. The method according to claim 14, wherein the second interest packet comprises one or more second interest packets.

17. The method according to claim 1, wherein carrying, by the destination device, a piggyback interest identifier in the data packet comprises:
carrying, by the destination device, the piggyback interest identifier in a digital signature information field of the data packet; or
adding, by the destination device, a first field to the data packet, and carrying the piggyback interest identifier in the first field.

18. The method according to claim 14, wherein carrying, by the destination device, the second interest packet in the data packet comprises:
adding, by the destination device, a second field in front of a data payload field to the data packet, and carrying the second interest packet in the second field; or
adding, by the destination device, a third field behind the data payload field to the data packet, and carrying the second interest packet in the third field.

19. A packet processing method, comprising:
receiving, by a source device, a first data packet, wherein the first data packet is generated by a destination device according to a first interest packet of the source device and is forwarded via a forwarding node and carries a piggyback interest identifier that is used to identify whether the first data packet carries a second interest packet, wherein the first interest packet is used by the source device to request content from the destination device; the forwarding node comprises a pending information table (PIT), the PIT comprises one or more PIT entries, and each PIT entry comprises a content name and a port; and after receiving the first data packet and determining that the first data packet carries the second interest packet, the forwarding node generates or updates a PIT entry corresponding to the second interest packet, wherein the second interest packet is used by the destination device to request content from the source device;
when determining that the first data packet carries the second interest packet, acquiring, by the source device, the second interest packet from the first data packet, and generating a second data packet according to the second interest packet, wherein the second data packet carries a content name that is the same as a content name of the content requested by using the second interest packet; and
sending, by the source device, the second data packet to the forwarding node, so that the forwarding node matches the content name carried in the second data packet with the content name in the PIT entry, and forwards the second data packet to the destination device according to the port in the matched PIT entry.

20. The method according to claim 19, wherein:
determining that the first data packet carries the second interest packet includes determining a value of the piggyback interest identifier.

21. The method according to claim 19, further comprising:
acquiring, from the first data packet, the content requested by using the first interest packet; and
processing the content.

22. The method according to claim 19, wherein the second interest packet comprises one or more second interest packets.

23. A forwarding node, comprising:
a memory storing a pending information table (PIT) comprising one or more PIT entries, and each PIT entry comprises a content name and a port; and
a processor in communication with the memory, wherein the processor is configured to:
receive a data packet, wherein the data packet is generated and sent by a destination device after the destination device receives a first interest packet that is sent by a source device and is forwarded via the forwarding node, wherein the first interest packet is used by the source device to request content from the destination device, the data packet carries a content name that is the same as a content name of the content requested by using the first interest packet, and when forwarding the first interest packet, the forwarding node matches the first interest packet with the pending information table, so that the pending information table comprises a PIT entry corresponding to the first interest packet; and
when determining that the data packet carries a second interest packet, match the content name carried in the data packet with the content name in the PIT entry, and forward the data packet to the source device according to the port in the matched PIT entry, wherein the second interest packet is used by the destination device to request content from the source device, and wherein the data packet carries a piggyback interest identifier that is used to identify whether the data packet carries the second interest packet.

24. The forwarding node according to claim 23, wherein the processor is further configured to:
query a local storage table according to a content name in the second interest packet, and determine whether content corresponding to the content name in the second interest packet exists in the local storage table; and
if the content corresponding to the content name in the second interest packet does not exist in the local storage table, when determining that the data packet carries the second interest packet, match the content name carried in the data packet with the content name in the PIT entry, and forward the data packet to the source device according to the port in the matched PIT entry.

25. The forwarding node according to claim 24, wherein the processor is further configured to:
before matching the content name carried in the data packet with the content name in the PIT entry, and forwarding the data packet to the source device according to the port in the matched PIT entry, if the content corresponding to the content name in the second interest packet exists in the local storage table, send, through a port through which the data packet is received, the content that is in the local storage table and corresponds to the content name in the second interest packet.

26. The forwarding node according to claim 25, wherein the processor is further configured to:
if the content corresponding to the content name in the second interest packet exists in the local storage table, send, through the port through which the data packet is received, the content that is in the local storage table and corresponds to the content name in the second interest packet, delete the second interest packet from the data packet, match the content name carried in the data packet with the content name in the PIT entry, and forward, to the source device according to the port in the matched PIT entry, the data packet from which the second interest packet is deleted.

27. The forwarding node according to claim 23, wherein the processor is further configured to: after the data packet is received and it is determined that the data packet carries the second interest packet, generate or update a PIT entry corresponding to the second interest packet.

28. The forwarding node according to claim 27, wherein the processor is further configured to:
   query the pending information table according to the content name in the second interest packet; and
   if a PIT entry which comprises the content name in the second interest packet exists in the pending information table, add, to the PIT entry which comprises the content name in the second interest packet, information about the port through which the data packet is received, so as to update the PIT entry corresponding to the second interest packet; or
   if the PIT entry which comprises the content name in the second interest packet does not exist in the pending information table, add, to the pending information table, the PIT entry which comprises the content name in the second interest packet and information about the port through which the data packet is received, so as to generate the PIT entry corresponding to the second interest packet.

29. The forwarding node according to claim 23, wherein the processor is further configured to: when determining that the data packet does not carry the second interest packet, match the content name carried in the data packet with the content name in the PIT entry, and forward the data packet to the source device according to the port in the matched PIT entry.

30. The forwarding node according to claim 23, wherein the processor is further configured to: after the data packet is forwarded to the source device according to the port in the matched PIT entry, remove the matched PIT entry from the pending information table.

31. The forwarding node according to claim 23, wherein the second interest packet comprises one or more second interest packets.

32. The forwarding node according to claim 23, wherein the determining that the data packet carries the second interest packet is performed by determining a value of the piggyback interest identifier.

33. The forwarding node according to claim 23, wherein a manner of carrying the piggyback interest identifier in the data packet comprises:
   carrying the piggyback interest identifier in a digital signature information field of the data packet; or
   adding a first field to the data packet, and carrying the piggyback interest identifier in the first field.

34. The forwarding node according to claim 23, wherein a manner of carrying the second interest packet in the data packet comprises:
   adding a second field in front of a data payload field to the data packet, and carrying the second interest packet in the second field; or
   adding a third field behind the data payload field to the data packet, and carrying the second interest packet in the third field.

35. The forwarding node according to claim 23, wherein the processor is further configured to: when multiple other forwarding nodes exist between the forwarding node and the source device, if determining that the data packet carries the second interest packet, match the content name carried in the data packet with the content name in the PIT entry, and forward the data packet to a next forwarding node according to the port in the matched PIT entry, so that after receiving the data packet and when determining that the data packet carries the second interest packet, the next forwarding node matches the content name carried in the data packet with the content name in the PIT entry, and then forwards the data packet to the next forwarding node according to the port in the matched PIT entry, and so on, so as to forward the data packet to the source device.

36. A terminal device, comprising:
   a memory; and
   a processor in communication with the memory, wherein the processor is configured to:
   generate a data packet according to a received first interest packet, wherein the first interest packet is forwarded by a source device via a forwarding node and is used by the source device to request content from the terminal device, wherein the forwarding node comprises a pending information table (PIT) comprising one or more PIT entries, and each PIT entry comprises a content name and a port, and when forwarding the first interest packet, the forwarding node matches the first interest packet with the pending information table, so that the pending information table comprises a PIT entry corresponding to the first interest packet;
   when it is determined that a second interest packet which is going to be sent to the source device needs to be carried in the data packet, carry the second interest packet, and a piggyback interest identifier that is used to identify whether the data packet carries the second interest packet, in the data packet, wherein the second interest packet is used by the terminal device to request content from the source device; and
   send the data packet to the forwarding node, so that when determining that the data packet carries the second interest packet, the forwarding node matches a content name carried in the data packet with the content name in the PIT entry, and forwards the data packet to the source device according to the port in the matched PIT entry.

37. The terminal device according to claim 36, wherein the processor is further configured to set a value of the piggyback interest identifier to a value used to identify that the data packet carries the second interest packet.

38. The terminal device according to claim 36, wherein the second interest packet comprises one or more second interest packets.

39. The terminal device according to claim 36, wherein the processor is further configured to:
   carry the piggyback interest identifier in a digital signature information field of the data packet; or
   add a first field to the data packet, and carry the piggyback interest identifier in the first field.

40. The terminal device according to claim 36, wherein the processor is further configured to:
   add a second field in front of a data payload field to the data packet, and carry the second interest packet in the second field; or
   add a third field behind the data payload field to the data packet, and carry the second interest packet in the third field.

41. A terminal device, comprising:
   a memory; and
   a processor in communication with the memory, wherein the processor is configured to:

receive a first data packet, wherein the first data packet is generated by a destination device according to a first interest packet of the terminal device and is forwarded via a forwarding node, wherein the first interest packet is used by the terminal device to request content from the destination device; the forwarding node comprises a pending information table (PIT) comprising one or more PIT entries, and each PIT entry comprises a content name and a port, and after receiving the first data packet and determining that the first data packet carries a second interest packet, the forwarding node generates or updates a PIT entry corresponding to the second interest packet, wherein the second interest packet is used by the destination device to request content from the terminal device;

when it is determined that the first data packet carries the second interest packet and carries a piggyback interest identifier that is used to identify whether the data packet carries the second interest packet, acquire the second interest packet from the first data packet, and generate a second data packet according to the second interest packet, wherein the second data packet carries a content name that is the same as a content name of the content requested by using the second interest packet; and send the second data packet to the forwarding node, so that the forwarding node matches the content name carried in the second data packet with the content name in the PIT entry, and forwards the second data packet to the destination device according to the port in the matched PIT entry.

42. The terminal device according to claim 41, wherein:

the first data packet further carries a piggyback interest identifier that is used to identify whether the first data packet carries the second interest packet; and the processor is further configured to: when it is determined, by determining a value of the piggyback interest identifier, that the first data packet carries the second interest packet, acquire the second interest packet from the first data packet, and generate the second data packet according to the second interest packet.

43. The terminal device according to claim 41, wherein the processor is further configured to acquire, from the first data packet, the content requested by using the first interest packet, and process the content.

44. The terminal device according to claim 41, wherein the second interest packet comprises one or more second interest packets.

* * * * *